(12) United States Patent
Pande et al.

(10) Patent No.: US 7,970,412 B2
(45) Date of Patent: *Jun. 28, 2011

(54) AIDED LOCATION COMMUNICATION SYSTEM

(75) Inventors: Ashutosh Pande, Noida (IN); Lionel Jacques Garin, Palo Alto, CA (US); Kanwar Chadha, Los Gatos, CA (US); Kurt Christian Schmidt, Lawndale, CA (US); Leon Kuo-Liang Peng, Mountain View, CA (US); Gengsheng Zhang, Cupertino, CA (US); Nicolas Patrick Vantalon, Nice (FR); Gregory B. Turetzky, San Jose, CA (US)

(73) Assignee: SiRF Technology, Inc., San Jose, CA (US)

( * ) Notice: Subject to any disclaimer, the term of this patent is extended or adjusted under 35 U.S.C. 154(b) by 951 days.

This patent is subject to a terminal disclaimer.

(21) Appl. No.: 11/185,533

(22) Filed: Jul. 20, 2005

(65) Prior Publication Data

US 2006/0038719 A1    Feb. 23, 2006

Related U.S. Application Data

(63) Continuation-in-part of application No. 10/885,507, filed on Jul. 3, 2004, which is a continuation-in-part of application No. PCT/US03/16308, filed on May 22, 2003, which is a continuation-in-part of application No. 10/155,614, filed on May 22, 2002, now Pat. No. 6,684,158, which is a continuation-in-part of application No. 09/795,871, filed on Feb. 28, 2001, now Pat. No. 6,427,120, said application No.

(Continued)

(51) Int. Cl.
*H04W 24/00*    (2009.01)

(52) U.S. Cl. ............ 455/456.1; 342/457; 342/387; 342/352; 701/213; 701/200

(58) Field of Classification Search ........... 455/456.1, 455/456.6, 12.1, 13.2, 440; 701/213, 200; 342/357.12, 357.06, 357.1, 357.05, 357.03, 342/357.09, 457, 387, 352
See application file for complete search history.

(56) References Cited

U.S. PATENT DOCUMENTS 4,426,712 A    1/1984    Gorski-Popiel
(Continued)

FOREIGN PATENT DOCUMENTS

EP    0511741    11/1992
(Continued)

OTHER PUBLICATIONS

Soliman et al., gps One: A hybrid position location system, 2000 IEEE, pp. 334-335.
(Continued)

*Primary Examiner* — Pierre-Louis Desir
(74) *Attorney, Agent, or Firm* — RatnerPrestia

(57) ABSTRACT

An Aided Location Communication System ("ALCS") is described that may include a geolocation server and a wireless communication device having a GPS section where the GPS receiver section is capable of being selectively switched between a standalone mode and at least one other mode for determining a geolocation of the wireless communications device. An Aided Location Communication Device ("ALCD") is also described. The ALCD includes a position-determination section having a GPS receiver and a communication section where the position-determination section is selectively switchable between a GPS-standalone mode and at least one other mode for determining a geolocation of the ALCD.

137 Claims, 19 Drawing Sheets

Related U.S. Application Data

10/885,507 is a continuation of application No. 10/127,229, filed on Apr. 19, 2002, now Pat. No. 6,542,823, which is a continuation of application No. 09/975,871, filed on Feb. 28, 2001, now Pat. No. 6,427,120, said application No. 10/885,507 is a continuation-in-part of application No. 10/194,627, filed on Jul. 12, 2002, which is a continuation of application No. 10/068,751, filed on Feb. 5, 2002, now Pat. No. 6,519,466, which is a continuation of application No. 09/781,068, filed on Feb. 8, 2001, now Pat. No. 6,389,291, said application No. 10/885,507 is a continuation-in-part of application No. 10/700,821, filed on Nov. 4, 2003, which is a continuation-in-part of application No. 09/575,492, filed on May 18, 2000, now Pat. No. 6,671,620, application No. 11/185,533, which is a continuation-in-part of application No. 10/997,797, filed on Nov. 24, 2004, which is a continuation-in-part of application No. 10/759,677, filed on Jan. 18, 2004, which is a continuation of application No. 10/017,115, filed on Dec. 13, 2001, now Pat. No. 6,778,136, application No. 11/185,533, which is a continuation-in-part of application No. 11/089,455, filed on Mar. 24, 2005, which is a continuation-in-part of application No. 10/855,507, filed on Jul. 3, 2004, application No. 11/185,533, which is a continuation-in-part of application No. 11/022,294, filed on Dec. 22, 2004, which is a continuation-in-part of application No. 10/855,507, filed on Jul. 3, 2004, application No. 11/185,533, which is a continuation-in-part of application No. 10/213,767, filed on Aug. 7, 2002, now Pat. No. 7,009,555, which is a continuation of application No. 09/828,066, filed on Apr. 5, 2001, now Pat. No. 6,462,708, application No. 11/185,533, which is a continuation-in-part of application No. 10/199,253, filed on Jul. 18, 2002, application No. 11/185,533, which is a continuation-in-part of application No. 11/149,438, filed on Jun. 6, 2005, which is a continuation of application No. 10/269,914, filed on Oct. 10, 2002, application No. 11/185,533, which is a continuation-in-part of application No. 10/269,105, filed on Oct. 10, 2002, and a continuation-in-part of application No. 10/269,104, filed on Oct. 10, 2002.

(60) Provisional application No. 60/306,620, filed on Jul. 18, 2001, provisional application No. 60/225,076, filed on Aug. 14, 2000.

(56) References Cited

U.S. PATENT DOCUMENTS

| | | |
|---|---|---|
| 4,445,118 A | 4/1984 | Taylor et al. |
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |
| 4,785,463 A | 11/1988 | Janc et al. |
| 4,809,005 A | 2/1989 | Counselman, III |
| 4,821,294 A | 4/1989 | Thomas, Jr. |
| 4,890,233 A | 12/1989 | Ando et al. |
| 4,894,662 A | 1/1990 | Counselman |
| 4,998,111 A | 3/1991 | Ma et al. |
| 5,014,066 A | 5/1991 | Counselman, III |
| 5,036,329 A | 7/1991 | Ando |
| 5,043,736 A | 8/1991 | Darnell et al. |
| 5,108,334 A | 4/1992 | Eschenbach et al. |
| 5,177,490 A | 1/1993 | Ando et al. |
| 5,202,829 A | 4/1993 | Geier |
| 5,223,844 A | 6/1993 | Mansell et al. |
| 5,225,842 A | 7/1993 | Brown et al. |
| 5,257,195 A | 10/1993 | Hirata |
| 5,293,170 A | 3/1994 | Lorenz et al. |
| 5,311,195 A | 5/1994 | Mathis et al. |
| 5,323,164 A | 6/1994 | Endo |
| 5,343,209 A | 8/1994 | Sennott et al. |
| 5,345,244 A | 9/1994 | Gildea et al. |
| 5,347,284 A | 9/1994 | Volpi et al. |
| 5,347,536 A | 9/1994 | Meehan |
| 5,365,450 A | 11/1994 | Schuchman et al. |
| 5,379,224 A | 1/1995 | Brown et al. |
| 5,402,347 A | 3/1995 | McBurney et al. |
| 5,402,441 A | 3/1995 | Washizu et al. |
| 5,416,712 A | 5/1995 | Geier et al. |
| 5,420,593 A | 5/1995 | Niles |
| 5,422,813 A | 6/1995 | Schuchmman et al. |
| 5,440,313 A | 8/1995 | Osterdock et al. |
| 5,450,344 A | 9/1995 | Woo et al. |
| 5,504,684 A | 4/1996 | Lau et al. |
| 5,506,587 A | 4/1996 | Lans |
| 5,535,278 A | 7/1996 | Cahn et al. |
| 5,587,715 A | 12/1996 | Lewis |
| 5,592,173 A | 1/1997 | Lau et al. |
| 5,625,668 A | 4/1997 | Loomis et al. |
| 5,663,734 A | 9/1997 | Krasner |
| 5,663,735 A | 9/1997 | Eshenbach |
| 5,666,330 A | 9/1997 | Zampetti |
| 5,701,328 A | 12/1997 | Schuchman et al. |
| 5,726,893 A | 3/1998 | Schuchman et al. |
| 5,739,786 A | 4/1998 | Greenspan et al. |
| 5,757,786 A | 5/1998 | Joo |
| 5,781,156 A | 7/1998 | Krasner |
| 5,786,789 A | 7/1998 | Janky |
| 5,812,087 A | 9/1998 | Krasner |
| 5,825,327 A | 10/1998 | Krasner |
| 5,828,694 A | 10/1998 | Schipper |
| 5,831,574 A | 11/1998 | Krasner |
| 5,841,396 A | 11/1998 | Krasner |
| 5,845,203 A | 12/1998 | LaDue |
| 5,854,605 A | 12/1998 | Gildea |
| 5,874,914 A | 2/1999 | Krasner |
| 5,877,724 A | 3/1999 | Davis |
| 5,877,725 A | 3/1999 | Kalafus |
| 5,883,594 A | 3/1999 | Lau |
| 5,884,214 A | 3/1999 | Krasner |
| 5,889,474 A | 3/1999 | LaDue |
| 5,903,654 A | 5/1999 | Milton et al. |
| 5,907,578 A | 5/1999 | Pon et al. |
| 5,907,809 A | 5/1999 | Molnar et al. |
| 5,917,444 A | 6/1999 | Loomis et al. |
| 5,920,283 A | 7/1999 | Shaheen et al. |
| 5,923,703 A | 7/1999 | Pon et al. |
| 5,926,131 A | 7/1999 | Sakumoto et al. |
| 5,936,572 A | 8/1999 | Loomis et al. |
| 5,940,027 A | 8/1999 | Forseth et al. |
| 5,943,363 A | 8/1999 | Hanson et al. |
| 5,945,944 A | 8/1999 | Krasner |
| 5,963,582 A | 10/1999 | Stansell, Jr. |
| 5,966,403 A | 10/1999 | Pon |
| 5,977,909 A | 11/1999 | Harrison et al. |
| 5,982,324 A | 11/1999 | Watters et al. |
| 5,987,016 A | 11/1999 | He |
| 5,999,124 A | 12/1999 | Sheynblat |
| 6,002,362 A | 12/1999 | Gudat |
| 6,002,363 A | 12/1999 | Krasner |
| 6,009,551 A | 12/1999 | Sheynblat |
| 6,016,119 A | 1/2000 | Krasner |
| 6,040,798 A | 3/2000 | Kinal et al. |
| 6,041,222 A | 3/2000 | Horton et al. |
| 6,047,017 A | 4/2000 | Cahn et al. |
| 6,052,081 A | 4/2000 | Krasner |
| 6,061,018 A | 5/2000 | Sheynblat |
| 6,064,336 A | 5/2000 | Krasner |
| 6,081,229 A | 6/2000 | Soliman et al. |
| 6,085,090 A * | 7/2000 | Yee et al. .................. 455/440 |
| 6,097,974 A | 8/2000 | Camp, Jr. et al. |

| | | | | | |
|---|---|---|---|---|---|
| 6,104,338 A | 8/2000 | Krasner | 6,583,757 B2 | 6/2003 | Krasner |
| 6,104,340 A | 8/2000 | Krasner | 6,597,311 B2 | 7/2003 | Sheynblat |
| 6,104,712 A | 8/2000 | Robert et al. | 6,633,255 B2 | 10/2003 | Krasner |
| 6,107,960 A | 8/2000 | Krasner | 6,650,694 B1 | 11/2003 | Brown et al. |
| 6,111,540 A | 8/2000 | Krasner | 6,677,894 B2 | 1/2004 | Sheynblat et al. |
| 6,111,541 A | 8/2000 | Karmel | 6,684,158 B1 | 1/2004 | Gariu et al. |
| 6,122,506 A | 9/2000 | Lu et al. | 6,707,423 B2 | 3/2004 | Turetzky et al. |
| 6,131,067 A | 10/2000 | Girerd et al. | 6,720,920 B2 | 4/2004 | Breed et al. |
| 6,133,871 A | 10/2000 | Krasner | 6,731,238 B2 | 5/2004 | Johnson |
| 6,133,873 A | 10/2000 | Krasner | 6,738,630 B2 | 5/2004 | Ashmore |
| 6,133,874 A | 10/2000 | Krasner | 6,748,217 B1 | 6/2004 | Hunzinger et al. |
| 6,150,980 A | 11/2000 | Krasner | 6,829,534 B2 | 12/2004 | Fuchs et al. |
| 6,172,640 B1 | 1/2001 | Durst et al. | 6,873,288 B2 | 3/2005 | Heppe |
| 6,178,195 B1 | 1/2001 | Durboraw, III et al. | 6,915,208 B2 * | 7/2005 | Garin et al. ................ 701/213 |
| 6,185,427 B1 | 2/2001 | Krasner et al. | 7,091,904 B2 | 8/2006 | Vantalon et al. |
| 6,188,351 B1 | 2/2001 | Bloebaum | 7,154,436 B1 * | 12/2006 | Chadha ..................... 342/357.1 |
| 6,208,290 B1 | 3/2001 | Krasner | 2002/0064209 A1 | 5/2002 | Turetzky et al. |
| 6,208,291 B1 | 3/2001 | Krasner | 2002/0080063 A1 | 6/2002 | Bloebaum et al. |
| 6,211,819 B1 | 4/2001 | King et al. | 2002/0142783 A1 | 10/2002 | Yoldi et al. |
| 6,215,441 B1 | 4/2001 | Moeglein | 2003/0104818 A1 | 6/2003 | Kotziu |
| 6,215,442 B1 | 4/2001 | Sheynblat | 2003/0125044 A1 | 7/2003 | Deloach et al. |
| 6,222,484 B1 | 4/2001 | Seiple et al. | 2003/0176204 A1 | 9/2003 | Abraham |
| 6,225,944 B1 * | 5/2001 | Hayes ........................ 342/357.1 | 2004/0130484 A1 | 7/2004 | Krasner |
| 6,236,354 B1 | 5/2001 | Krasner | 2004/0162084 A1 | 8/2004 | Wang |
| 6,236,365 B1 | 5/2001 | LeBlanc et al. | | | |
| 6,239,742 B1 | 5/2001 | Krasner | | FOREIGN PATENT DOCUMENTS | |
| 6,249,245 B1 * | 6/2001 | Watters et al. ........... 342/357.03 | EP | 1 092 987 | 4/2001 |
| 6,252,543 B1 | 6/2001 | Camp et al. | EP | 1 427 236 A | 6/2004 |
| 6,259,399 B1 | 7/2001 | Krasner | EP | 1 452 886 A | 9/2004 |
| 6,263,280 B1 | 7/2001 | Stingone, Jr. | GB | 2115195 | 1/1983 |
| 6,272,430 B1 * | 8/2001 | Krasner ........................ 701/207 | GB | 2 335 554 A | 3/1998 |
| 6,289,041 B1 | 9/2001 | Krasner | JP | 58-105632 | 6/1983 |
| 6,307,504 B1 | 10/2001 | Sheynblat | JP | 7-36035 | 5/1986 |
| 6,313,786 B1 | 11/2001 | Sheynblat et al. | JP | 4-326079 | 11/1992 |
| 6,314,308 B1 | 11/2001 | Sheynblat | JP | 2000-102058 | 4/2000 |
| 6,327,473 B1 | 12/2001 | Soliman et al. | WO | WO 90/11652 | 10/1990 |
| 6,347,228 B1 | 2/2002 | Ludden et al. | WO | WO 99/47943 | 9/1999 |
| 6,353,412 B1 | 3/2002 | Soliman | WO | WO 00/10031 | 2/2000 |
| 6,377,209 B1 | 4/2002 | Krasner | WO | WO 00/45191 | 8/2000 |
| 6,389,291 B1 | 5/2002 | Pande et al. | WO | WO 01/62034 A | 8/2001 |
| 6,400,314 B1 | 6/2002 | Krasner | WO | WO 02/04975 | 1/2002 |
| 6,405,132 B1 | 6/2002 | Breed et al. | WO | WO 03/098258 | 11/2003 |
| 6,408,196 B2 | 6/2002 | Sheynblat | WO | W02006014170 | 2/2006 |
| 6,411,254 B1 | 6/2002 | Moeglein | | | |
| 6,411,811 B2 | 6/2002 | Kingdon et al. | | OTHER PUBLICATIONS | |
| 6,411,892 B1 | 6/2002 | Van Diggelen | | | |
| 6,414,987 B1 | 7/2002 | Pon | | | |
| 6,417,801 B1 | 7/2002 | Van Diggelen | | | |
| 6,421,002 B2 | 7/2002 | Krasner | | | |
| 6,427,120 B1 | 7/2002 | Garin et al. | | | |
| 6,429,814 B1 | 8/2002 | Van Diggelen et al. | | | |
| 6,429,815 B1 | 8/2002 | Soliman | | | |
| 6,433,731 B1 | 8/2002 | Sheynblat | | | |
| 6,433,739 B1 | 8/2002 | Soliman | | | |
| 6,453,237 B1 | 9/2002 | Fuchs et al. | | | |
| 6,456,234 B1 | 9/2002 | Johnson | | | |
| 6,462,708 B1 | 10/2002 | Tsujimoto et al. | | | |
| 6,466,612 B2 | 10/2002 | Kohli et al. | | | |
| 6,473,030 B1 | 10/2002 | McBurney et al. | | | |
| 6,480,145 B1 | 11/2002 | Hasegawa | | | |
| 6,484,097 B2 | 11/2002 | Fuchs et al. | | | |
| 6,487,499 B1 | 11/2002 | Fuchs et al. | | | |
| 6,505,161 B1 | 1/2003 | Brems | | | |
| 6,510,387 B2 | 1/2003 | Fuchs et al. | | | |
| 6,519,466 B2 * | 2/2003 | Pande et al. ................ 455/456.1 | | | |
| 6,526,352 B1 | 2/2003 | Breed et al. | | | |
| 6,529,829 B2 | 3/2003 | Turetzky et al. | | | |
| 6,542,821 B2 | 4/2003 | Krasner | | | |
| 6,542,823 B2 * | 4/2003 | Garin et al. ................ 701/213 | | | |
| 6,559,794 B1 * | 5/2003 | Nakajima et al. ........ 342/357.31 | | | |
| 6,583,734 B2 | 6/2003 | Bates et al. | | | |

New Fast GPS Code-Acquisition Using FFT, Electronic Letters, vol. 27, No. 2, pp. 158-160 (1991).
Novel Fast GPS/GLONASS Code Acquisition Technique Using Low Update Rate FFT, Electronic Letters, vol. 28, No. 9, pp. 863-865 (1992).
Marketing Material: Qualcomm CDMA Technologies—Integrated Solutions—MGP6200™ Multimode GPS Processor (8 pages).
Marketing Material: uNav Microelectronics—uN9x18 Low Power, High Performance GPS Receiver Chipset/uN9x18 GPS Receiver Solution (9 pages).
Marketing Material: uNav Microelectronics, uN9x18 Low Power, High Performance GPS Receiver Chipset (2 pages).
Marketing Material: Global Locate—Hammerhead II™, Single Chip AGPS Solution (2 pages).
Marketing Material/Press Release: Broadcom Introduces Advanced Single-Chip GPS Solution for Mobile Applications (3 pages).
Marketing Material/White Paper: SnapTrack: A Qualcomm Company—SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages).

* cited by examiner

AIDED LOCATION COMMUNICATION SYSTEM

CROSS REFERENCE TO RELATED APPLICATIONS

This application is a continuation-in-part of U.S. patent application Ser. No. 10/885,507, filed Jul. 3, 2004, titled "Aided Location Communication System," which is a continuation-in-part of PCT application Serial No. PCT/US03/16308, filed May 22, 2003, titled "Search Domain Reducing Frequency Transfer in a Multi-mode Global Positioning System Used With Wireless Networks," which is a continuation-in-part of U.S. patent application Ser. No. 10/155,614, filed May 22, 2002, titled "Search Domain Reducing Frequency Transfer in a Multi-mode Global Positioning System Used With Wireless Networks," now U.S. Pat. No. 6,684,158, which is a continuation-in-part of U.S. patent application Ser. No. 09/795,871, filed Feb. 28, 2001, titled "Information Transfer in a Multi-mode Global Positioning System Used with Wireless Networks," now U.S. Pat. No. 6,427,120, which claims priority under Section 119(e) to U.S. Provisional Application Ser. No. 60/225,076, filed Aug. 14, 2000, all of which are incorporated into this application by reference in their entirety.

Additionally, U.S. patent application Ser. No. 10/885,507 is a continuation-in-part of U.S. patent application Ser. No. 10/385,198, filed Mar. 10, 2003, titled "Information Transfer in a Multi-mode GPS Used with Wireless Networks," which is a continuation of U.S. patent application Ser. No. 10/127,229, filed Apr. 19, 2002, titled "Information Transfer in a Multi-mode GPS Used with Wireless Networks," now U.S. Pat. No. 6,542,823, which is a continuation of U.S. patent application Ser. No. 09/795,871, filed Feb. 28, 2001, titled "Information Transfer in a Multi-mode Global Positioning System Used with Wireless Networks," now U.S. Pat. No. 6,427,120, which claims priority under Section 119(e) to U.S. Provisional Application Ser. No. 60/225,076, filed Aug. 14, 2000, all of which are incorporated into this application by reference in their entirety.

U.S. patent application Ser. No. 10/885,507 is also a continuation-in-part of U.S. patent application Ser. No. 10/194,627, filed Jul. 12, 2002, titled "Multi-mode GPS For Use with Wireless Networks," which is a continuation of U.S. patent application Ser. No. 10/068,751, filed Feb. 5, 2002, titled "Multi-mode Global Positioning System For Use with Wireless Networks," now U.S. Pat. No. 6,519,466, which is a continuation of U.S. patent application Ser. No. 09/781,068, filed Feb. 8, 2001, titled "Multi-mode Global Positioning System For Use with Wireless Networks," now U.S. Pat. No. 6,389,291, which claims priority under Section 119(e) to U.S. Provisional Application Ser. No. 60/225,076, filed Aug. 14, 2000, all of which are incorporated into this application by reference in their entirety.

U.S. patent application Ser. No. 10/885,507 is also a continuation-in-part of U.S. patent application Ser. No. 10/700,821, filed Nov. 4, 2003, titled "Satellite Based Positioning Method and System for Coarse Location Positioning," which is a continuation-in-part of U.S. patent application Ser. No. 09/575,492, filed May 18, 2000, titled "Method and Apparatus for Determining Global Position Using Almanac Information," now U.S. Pat. No. 6,671,620, both of which are incorporated into this application by reference in their entirety.

This application is also a continuation-in-part of U.S. patent application Ser. No. 10/997,797, filed Nov. 24, 2004, titled "Frequency Phase Correction System," which is a continuation-in-part of U.S. patent application Ser. No. 10/759,677, filed Jan. 18, 2004, titled "Fast Acquisition of a GPS Signal," which is a continuation of U.S. patent application Ser. No. 10/017,115, filed Dec. 13, 2001, titled "Fast Acquisition of a GPS Signal," now U.S. Pat. No. 6,778,136, both of which are incorporated into this application by reference in their entirety.

This application is also a continuation-in-part of U.S. patent application Ser. No. 11/089,455, filed Mar. 24, 2005, titled "A System For Providing Location Based Services Over A Network," which is a continuation-in-part of U.S. U.S. patent application Ser. No. 10/885,507, both of which are incorporated into this application by reference in their entirety.

This application is also a continuation-in-part of U.S. patent application Ser. No. 11/022,294, filed Dec. 22, 2004, titled "Satellite Positioning Aided Communication System Selection," which is a continuation-in-part of U.S. U.S. patent application Ser. No. 10/885,507, both of which are incorporated into this application by reference in their entirety.

This application is also a continuation-in-part of U.S. patent application Ser. No. 10/213,767, filed Aug. 7, 2002, now U.S. Pat. No. 7,009,555 titled "GPS Based Positioning System for Mobile GPS Terminals," which is a continuation of U.S. U.S. patent application Ser. No. 09/828,066, filed Apr. 5, 2001, titled "GPS Based Positioning System for Mobile GPS Terminals," now U.S. Pat. No. 6,462,708, both of which are incorporated into this application by reference in their entirety.

This application is also a continuation-in-part of U.S. patent application Ser. No. 10/199,253, filed Jul. 18, 2002, titled "Tracker Architecture for GPS System," which claims priority under Section 119(e) to U.S. Provisional Application Ser. No. 60/306,620, filed Jul. 18, 2001, titled "Tracker Architecture for GPS System," all of which are incorporated into this application by reference in their entirety.

This application is also a continuation-in-part of U.S. patent application Ser. No. 11/149,438, filed Jun. 6, 2005, titled "Host Based Satellite Positioning Systems," which is a continuation of U.S. patent application Ser. No. 10/269,914, filed Oct. 10, 2002, titled "Host Based Satellite Positioning Systems," both of which are incorporated into this application by reference in their entirety.

This application is also a continuation-in-part of U.S. patent application Ser. No. 10/269,105, filed Oct. 10, 2002, titled "Layered Host Based Satellite Positioning Solutions," which is incorporated into this application by reference in its entirety.

This application is also a continuation-in-part of U.S. patent application Ser. No. 10/269,104, filed Oct. 10, 2002, titled "Navigation Processing in Host Based Satellite Positioning Solution," which is incorporated into this application by reference in its entirety.

BACKGROUND OF THE INVENTION

1. Field of Invention

This invention relates to Global Positioning ("GPS") receivers, and in particular to multi-mode GPS receivers for use with wireless networks.

2. Related Art

The worldwide utilization of wireless devices such as two-way radios, portable televisions, Personal Digital Assistants ("PDAs") cellular telephones (also generally known a "mobile phones" and/or "cell phones"), satellite radio receivers and Global Positioning Systems ("GPS") is growing at a rapid pace. Cellular telephones, including Personal Communication System ("PCS") devices, have become commonplace. The use of these wireless devices to provide voice, data, and other services, such as Internet access, has provided many conveniences to cellular system users. Additionally, the number of features offered by many wireless service providers is increasingly matching the features offered by traditional land-line telephone service providers. Features such as call waiting, call forwarding, caller identification ("caller I.D."), three-way calling, data transmission and others are commonly offered by both land-line and wireless service providers. These features generally operate in the same manner on both wireless devices and land-line telephones.

Furthermore, other wireless communications systems, such as two-way paging, trunked radio, Specialized Mobile Radio ("SMR") utilized by police, fire, and paramedic departments, have also become common mobile communications.

GPS systems (also known as Satellite Positioning System "SPS" or Navigation Satellite System) have also become commonplace. In general, GPS systems are typically satellite (also known as "space vehicle" or "SV") based navigation systems. Examples of GPS systems include but are not limited to the United States ("U.S.") Navy Navigation Satellite System ("NNSS") (also know as TRANSIT), LORAN, Shoran, Decca, TACAN, NAVSTAR, the Russian counterpart to NAVSTAR known as the Global Navigation Satellite System ("GLONASS") and any future Western European GPS such as the proposed "Galileo" program. As an example, the US NAVSTAR GPS system is described in *GPS Theory and Practice,* Fifth ed., revised edition by Hofmann-Wellenhof, Lichtenegger and Collins, Springer-Verlag Wien NewYork, 2001, which is fully incorporated herein by reference.

Typically, GPS receivers receive radio transmissions from satellite-based radio navigation systems and use those received transmissions to determine the location of the GPS receiver. It is appreciated by those skilled in the art that the location of the GPS receiver may be determined by applying the well-known concept of intersection utilizing the determined distances from the GPS receiver to three GPS satellites that have known GPS satellite locations.

Generally, each GPS satellite in a GPS satellite-based radio navigation system broadcasts a radio transmission, that contains its location information, and orbit information. More specifically as an example, each of the orbiting GPS satellites in the United States GPS system contains four highly accurate atomic clocks: two Cesium and two Rubidium. These clocks provide precision timing pulses, which are utilized in generating two unique binary codes (also known as a pseudo random noise "PRN," or pseudo noise "PN" code), that are transmitted from the GPS satellites to Earth. These PN codes identify the specific GPS satellite in the GPS constellation.

Each GPS satellite also transmits a set of digitally coded ephemeris data that completely defines the precise orbit of the GPS satellite. The ephemeris data indicates where the GPS satellite is at any given time, and its location may be specified in terms of the GPS satellite ground track in precise latitude and longitude measurements. The information in the ephemeris data is coded and transmitted from the GPS satellite providing an accurate indication of the exact position of the GPS satellite above the earth at any given time.

Generally in GPS systems, there are four variables, namely, position determined by x, y, and z coordinates, and time (x, y, z, and t). These variables are determined by using triangulation techniques and accurate system clocks to determine the location of a GPS receiver through range, range-rate, and pseudo-range measurements made by or at the GPS receiver. To accurately determine the x, y, z, and t variables, four GPS satellite signals are typically needed to provide four simultaneous equations that are solved for the four variables.

These GPS satellites are configured, primarily, to provide a GPS receiver with the capability of determining its position, expressed for example by latitude, longitude, and elevation. This is typically accomplished by a resection process utilizing the distances measured from the GPS receiver to the GPS satellites.

As an example, if a GPS receiver utilized a clock that was precisely set to GPS system time a true distance, or range, to each GPS satellite from the GPS receiver could be accurately measured by recording the time required for the coded GPS satellite signal to reach the GPS receiver. Each range would define the surface of a sphere with its center at a given GPS satellite and the intersections of these spheres of at least three GPS satellites would yield three unknowns such as latitude, longitude, and elevation.

Unfortunately, GPS receivers typically utilize inexpensive crystal oscillator clocks that are set approximately to GPS system time. Therefore, these clocks is offset from the true GPS system time, and because of this offset, the distance measured to the GPS satellite differs from the "true" range. It is appreciated by those skilled in the art that these distances are known as "psuedoranges" because they are usually equal to the "true" range plus a range correction resulting from the GPS receiver clock error or bias. Generally, four simultaneously measured psuedoranges are needed to solve for four unknowns because these four unknowns include the three unknowns latitude, longitude, and elevation plus the GPS receiver clock bias (also known as a "time ambiguity"). It is appreciated that numerous well known techniques may be utilized to reduce the effects of the time ambiguity such as the solution described in U.S. Pat. No. 6,618,670, issued Sep. 9, 2003, and titled "Resolving Time Ambiguity in GPS Using Over-determined Navigation Solution," which is herein incorporated by reference in its entirety.

With the growing widespread use of these technologies, current trends are calling for the incorporation of GPS services into a broad range of electronic devices and systems, including PDAs, cellular telephones, portable computers, radios, satellite radios, trucked radio, SMR, automobiles, two-way pagers and the like. At the same time, electronic device manufacturers constantly strive to reduce costs and produce the most cost-attractive product possible for consumers.

In cellular telephony, the interest of integrating GPS receivers with cellular telephones stems from a new Federal Communications Commission ("FCC") requirement that cellular telephones be locatable within 50 feet once an emergency call, such as a "911" call (also referred to as "Enhanced 911" or "E911") is placed by a given cellular telephone. When emergencies occur, people are accustom to dialing 911 (normally referred to as a "911" call) on a land-based (also known as "land-line") telephone and contacting an emergency center that automatically is able to identify the location of the land-based telephone where the call originated.

Unfortunately, wireless devices, such as cellular telephones, are unable to communicate their location without a person actively entering or describing their location. In response, the United States Congress, through the FCC, has enacted a requirement that cellular telephones be locatable to within 50 feet once an emergency call, such as an E911, is placed by a given cellular telephone. This type of position data would assist police, paramedics, and other law enforcement and public service personnel, as well as other agencies that may need to have legal rights to determine the position of specific cellular telephone. The E911 services, however, operate differently on wireless devices than a 911 call does on land-line telephones.

When a 911 call is placed from a land-line telephone, the 911 reception center receives the call and determines the origin of the call. In case the caller fails, or forgets, to identify his or her location, the 911 reception center is able to obtain the location from which the call was made from the public telephone switching network (PSTN) and send emergency personnel to the location of the call.

If instead, an E911 call is placed from a wireless device such as a cellular telephone, the E911 reception center receives the call but cannot determine the origin of the call. If the caller fails, or forgets, to identify his or her location, the E911 reception center is unable to obtain the location of the call because the wireless network is different than the PSTN. At present, the best that the E911 reception center may do is to determine the location of the cell site from which the call was placed. Unfortunately, typical cell sites in a wireless network system may cover an area with approximately a 30-mile diameter. Further refinement of the location may be determinable in a digital network by the power setting of the calling wireless device. But, this still results in an area covering multiple miles.

A proposed solution to this problem includes integrating GPS receivers with cellular telephones. As an added benefit to this proposed solution is that any GPS data produced by an integrated GPS receiver may be utilized by the cellular telephone user for directions, latitude and longitude positions (locations or positions) of other locations or other cellular telephones that the cellular user is trying to locate, determination of relative location of the cellular user to other landmarks, directions for the cellular telephone user via internet maps or other GPS mapping techniques, etc. Such data may be of use for other than E911 calls, and would be very useful for cellular and PCS subscribers.

As an example of the current thrust to integrate GPS receivers with cellular telephony, U.S. Pat. No. 5,874,914, issued to Krasner, which is incorporated by reference herein, describes a method wherein a basestation (also known as a base station and/or the Mobile Telephone Switching Office "MTSO") transmits GPS satellite information, including Doppler information, to a remote unit (such as cellular telephone) utilizing a cellular data link, and computing pseudoranges to the in-view GPS satellites without receiving or utilizing GPS satellite ephemeris information.

The approach in Krasner, however, is limited by the number of data links that can be connected to a GPS-dedicated data supply warehouse. The system hardware needs to be upgraded to manage the additional requirements of delivering GPS information to each of the cellular or PCS users that are requesting GPS data. These additional requirements would be layered on top of the requirements to handle the normal voice and data traffic that is managed and delivered by the wireless system.

Another patent that concerns assistance between the GPS system and wireless networks is U.S. Pat. No. 5,365,450, issued to Schuchman, et al. which is also herein incorporated by reference. In the Schuchman reference, ephemeris aiding through the cellular telephone system is required for the GPS receiver to acquire and track GPS satellites. However, cellular and other wireless networks do not always have the capability to provide ephemeris aiding to the mobile GPS receiver.

Therefore, there is a need in the art for delivering GPS data to wireless communications systems, including cellular and PCS subscribers, in an efficient manner. There is also a need for GPS capable cellular and PCS telephones. Moreover, there is a need for GPS capable cellular and PCS telephones that may receive GPS satellite data for use by the cellular/PCS subscriber (i.e., the user). Additionally, there is a need for a large cellular system that is capable of utilizing and/or supplying GPS information to cellular telephone users for a number of applications, including E911 without the requirement of geographically proximate basestations.

SUMMARY

An Aided Location Communication System ("ALCS") is described that may include a geolocation server and a wireless communication device. The geolocation server is capable of receiving at least one signal from at least one Global Position System ("GPS") satellite and the wireless communication device may include a GPS receiver section. The GPS receiver section is capable of being selectively switched between a standalone mode and at least one other mode for determining a geolocation of the wireless communications device. The at least one other mode may include an autonomous mode, a network aided mode, reverse-aiding mode, augmented-autonomous mode and a network centric mode. The wireless communications device is capable of selectively sending the determined geolocation of the wireless communications device to the geolocation server.

An Aided Location Communication Device ("ALCD") is also described. The ALCD includes a position-determination section having a GPS receiver and a communication section in signal-communication with the position-determination section. The position-determination section is capable of receiving position-related signals and determining a geolocation for the ALCD from the received position-related signals and the position-determination section is selectively switchable between a GPS-standalone mode and at least one other mode for determining a geolocation of the ALCD, the at least one other mode including a GPS-autonomous mode, a GPS-network-aided mode, a GPS-network-centric mode, a reverse-aiding mode, a network-based and an augmented-autonomous mode. The communication is capable of receiving position-aiding information from an external location-aiding source, where the location-aiding source is located external to the ALCD.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
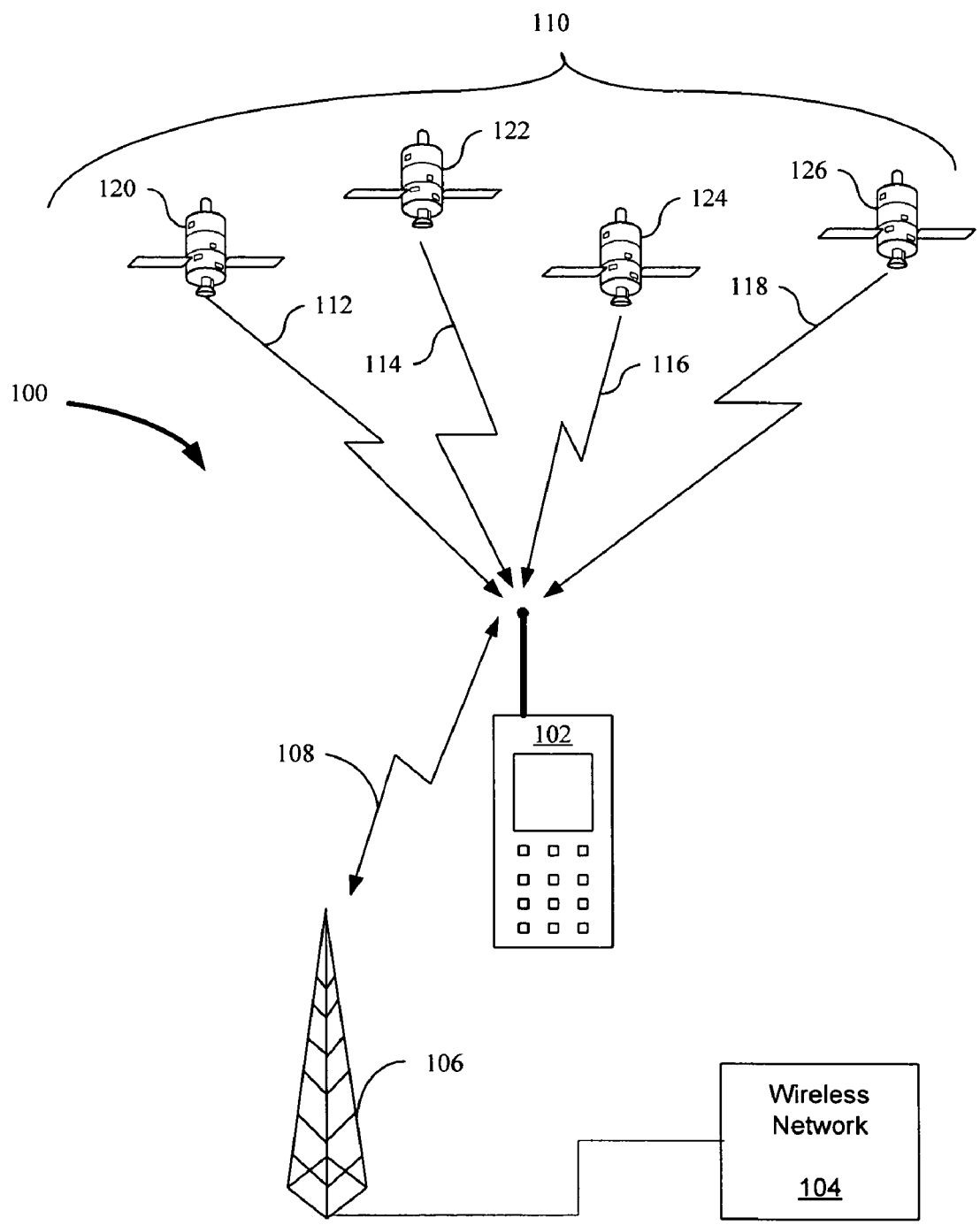
FIG. 1 illustrates an example of an implementation of a Aided Location Communication System ("ALCS") using an Aided Location Communication Device ("ALCD") having a GPS receiver located within the ALCD.

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of this invention.

Overview

It is appreciated by those skilled in the art that GPS systems include Satellite Positioning System "SPS" and/or Navigation Satellite Systems. In general, GPS systems are typically satellite (also known as "space vehicle" or "SV") based navigation systems. Examples of GPS systems include but are not limited to the United States ("U.S.") Navy Navigation Satellite System ("NNSS") (also know as TRANSIT), LORAN, Shoran, Decca, TACAN, NAVSTAR, the Russian counterpart to NAVSTAR known as the Global Navigation Satellite System ("GLONASS") and any future Western European GPS such as the proposed "Galileo" program. As an example, the US NAVSTAR GPS system is described in GPS Theory and Practice, Fifth ed., revised edition by Hofmann-Wellenhof, Lichtenegger and Collins, Springer-Verlag Wien New York, 2001, which is fully incorporated herein by reference.

When integrating GPS system components with wireless communications systems (that may include cellular, paging, two-way paging, Personal Data Assistant "PDA", Bluetooth, Wi-Fi and PCS systems), the GPS system should have the capability to acquire and track the GPS satellites under conditions that a typical wireless communications system user may encounter. Some of these conditions may include indoor use, use in dense urban areas that have limited sky view (such as in downtown areas with skyscrapers blocking satellite views, etc.). Although these conditions are typically manageable for terrestrial-based wireless communications systems, they are difficult environments for GPS systems. For example, in a traditional "GPS-standalone" mode where a GPS receiver acquires the signals from the GPS satellites, tracks the satellites, and, if desired, performs navigation without any outside information being delivered to the GPS system, typical GPS receivers have problems with long Time-To-First-Fix ("TTFF") times, and, further, have limited ability to acquire the GPS satellite signals under indoor or limited sky-view conditions. Even with some additional information, TTFF times may be over thirty seconds because ephemeris data must be acquired from the GPS system itself, which typically requires a strong GPS signal to acquire ephemeris data reliably. These conditions usually impact the reliability of the position availability, as well as, the power consumption within wireless communication devices such as, for example, cellular telephones.

To overcome these problems, an Aided Location Communication Device ("ALCD") is described that allows for multiple modes of operation depending on various factors. The ALCD may be cellular telephone, paging device, two-way pager, PDA, Bluetooth enabled device, Wi-Fi enable device, laptop computer, desktop computer, non-mobile device and/or PCS system. The ALCD may also be a semiconductor integrated circuit (i.e., a chip or chipset) within a device such as, for example, a cellular telephone, paging device, two-way pager, PDA, Bluetooth enabled device, Wi-Fi enable device, laptop computer, desktop computer, non-mobile device and/or PCS system.

The ALCD may operate in a GPS-standalone mode, GPS-autonomous mode, GPS-network-aided mode, GPS-network-centric mode, reverse-aiding mode, network-based and augmented-aiding mode. These multiple modes of operation allow the ALCD to operate in various environments and to receive and/or send "aiding" information to or from an external network or external aiding devices.

The ALCD includes a position-determination section, having GPS receiver, and/or a communication section and, as an example, the ALCD may be utilized in a "GPS-standalone" mode, when the GPS receiver in position-determination section is receiving a strong signal, has recent ephemeris or almanac data, or when an exact position is not required. In the GPS-standalone mode, the position-determination section does not receive any aiding and therefore operates independently from any available external networks or external aiding devices. In the GPS-standalone mode, the GPS receiver in the position-determination section acquires GPS satellite signals, and utilizes those signals to determine the location of the ALCD. The GPS receiver may also utilize the GPS satellite signals for tracking, and, if desired, navigation functions in the ALCD. The determined position of the ALCD may be utilized internally to the position-determination section or external to the position-determination section and internally to the communication section within the ALCD.

In another example, the ALCD may be utilized also in a "GPS-autonomous" mode, where the GPS receiver within the ALCD again receives a strong signal from a GPS satellite, has recent ephemeris or almanac data, or when an exact position is not required. Similar to the GPS-standalone mode, in the GPS-autonomous mode the position-determination section in the ALCD does not receive any aiding and therefore operates independently from any available external networks or external aiding devices. In the GPS-autonomous mode, the GPS receiver acquires GPS satellite signals, and uses those signals to determine the location of the ALCD. The GPS receiver may also use the GPS satellite signals for tracking, and, if desired, navigation functions. However, instead of only utilizing the determined position internally to the ALCD, in the autonomous mode, the ALCD also transmits the determined position of the ALCD to an external network that may include a geolocation server or other similar devices.

Similarly, in yet another example, the ALCD may be utilized also in a "reverse-aided" mode, where the GPS receiver again receives a strong signal, has recent ephemeris or almanac data, or when an exact position is not required. Similar to the GPS-autonomous mode and GPS-standalone mode, in the reverse-aided mode the position-determination section in the ALCD does not receive any aiding and therefore operates independently from any available external networks or external aiding devices. In reverse-aiding mode, the GPS receiver acquires GPS satellite signals, and uses those signals to determine the location of the ALCD. The GPS receiver in the position-determination section may also use the GPS satellite signals for tracking, and, if desired, navigation functions. However, instead of using the determined position internally to the ALCD, in the reverse-aiding mode, the ALCD transmits various types of measured information at the GPS receiver to an external network.

In yet another example, the ALCD may operate in a "GPS-network aided" mode if the GPS receiver in the ALCD does not receive a strong enough GPS signal, such as when the ALCD is utilized indoors, the position-determination section may switch to a different mode of operation where an external network such as a wireless communication system may help (i.e., "aid") the position-determination section to acquire, track, and/or navigate using the GPS signals received by the GPS receiver with additional information supplied by the external network or an external aiding device. The additional information may include almanac or sub-almanac information, coarse position information, Doppler data, in-view satellite positions, time and frequency aid, received wireless radio signal strength, or other aids that will aid the GPS receiver in acquiring the information that the GPS receiver needs to acquire, navigate, or track. The GPS-network aided mode approach differs from a "GPS-network centric" mode (also known as "GPS-mobile based" mode or "network-assisted" mode in other known literature) approach because in the GPS-network-aided mode approach, the GPS receiver in the ALCD is capable of eventually obtaining the position and tracking information needed to locate the ALCD by itself.

Additionally in another example, the ALCD may operate in a "network-based" mode in situations where the ALCD is utilized in an even harsher signal reception environment and the GPS receiver in the ALCD cannot receive any GPS signals. As such, the position-determination section in the ALCD may be completely dependent on an external network to obtain any positioning information. Typically, network-based modes compute position without using GPS or other GPS satellite information. Positions of the ALCD are derived from network resources such as cellular transmitter towers, Time Difference of Arrival ("TDOA") techniques, non-cellular wireless networks, etc.

Additionally in another example, the ALCD may operate in the GPS-network-centric mode in situations where the GPS receiver in the ALCD is constrained in performance or where the location of the ALCD is computed on the network. As such, the ALCD receives the signals in the position-determination section and transmits the position related data to the network for final position computation. This mode is also known as the "mobile-assisted" mode.

Similarly, in still another example, the ALCD may operate in an "augmented-autonomous" mode in situations where the ALCD is utilized in a harsh signal reception environment and cannot receive any GPS signals. In the augmented-autonomous mode, the ALCD may utilize various types of external location-aiding sources/devices or external networks to obtain location information that may be totally independent of any GPS information. In the augmented-autonomous mode, the ALCD computes its position without using GPS or other GPS satellite information. Positions of the ALCD are derived from network resources such as computer networks, communication networks, wireless networks or external devices that may transmit location information.

The ALCD may switch between these modes of operation based on several variables, as well as user-selected preferences or demands, and may switch either via local or remote control, or via either automatic or manual commands given to the ALCD.

The GPS Architecture

FIG. 1 is an example of an implementation of an Aided Location Communication System ("ALCS") 100 utilizing the ALCD 102 having a communication section (not shown) and a GPS receiver (not shown) located within the position-determination section (not shown) of the ALCD 102. As shown in FIG. 1, during operation, the ALCD 102 is in signal-communication with a wireless network 104 via a basestation 106 and wireless transmission path 108 and is in signal-communication with at least one GPS satellite of the GPS satellite constellation 110 via signal communication paths 112, 114, 116 and 118. It is appreciated by those skilled in the art that while only four GPS satellites 120, 122, 124 and 126 are shown, the GPS satellites 120, 122, 124 and 126 may be any number of GPS satellites from the GPS constellation 110 that are visible to ALCD 102.

The ALCD 102 may include both a GPS receiver (not shown) in a position-determination section (not shown) and a wireless processing section (not shown), also known as a "call processing" section, in a communication section (not shown). The GPS receiver within the ALCD 102 may receive GPS signals from the GPS satellite constellation 110 via signal communication paths 112, 114, 116 and 118 and the communication section of the ALCD 102 may receive wireless communication signals from the wireless network 104 via signal communication path 108 and basestation 106. In some implementations, the ALCD 102 may also send wireless communication signals to the wireless network 104 via signal communication path 108 and basestation 106. The ALCD 102 may be a wireless device such as a cellular telephone (also known as a wireless handset, cellphone, mobile telephone or mobile phone) or any other type of mobile device, including, but not limited to, personal digital assistants ("PDAs"), pagers, computer, two-way radio, trunked radio, specialized mobile radio ("SMR") or any other device for which it is desirable to determine location information. The ALCD 102 may also be a semiconductor integrated circuit (i.e., a chip) located within the wireless device or a combination of semiconductor integrated circuits (i.e., a chipset) located within the wireless device. Examples of the chip, or chipset, may any include any integrated circuit having a GPS receiver and a transceiver which may include application specific integrated circuit ("ASIC") or ASICs and digital signal processor ("DSP") or DSPs. In the case of a cellular telephone, the ALCD 102 may utilize a cellular transceiver in the communication section that operates at any radio frequency ("RF") band utilizing any transmission schemes including but not limited to CDMA, CDMA-2000, W-CDMA, TDMA, FDMA, GSM, UMTS, AMPS, Bluetooth, Wi-Fi and/or any combination or extension of these transmission schemes or similar schemes.

Figure 2:
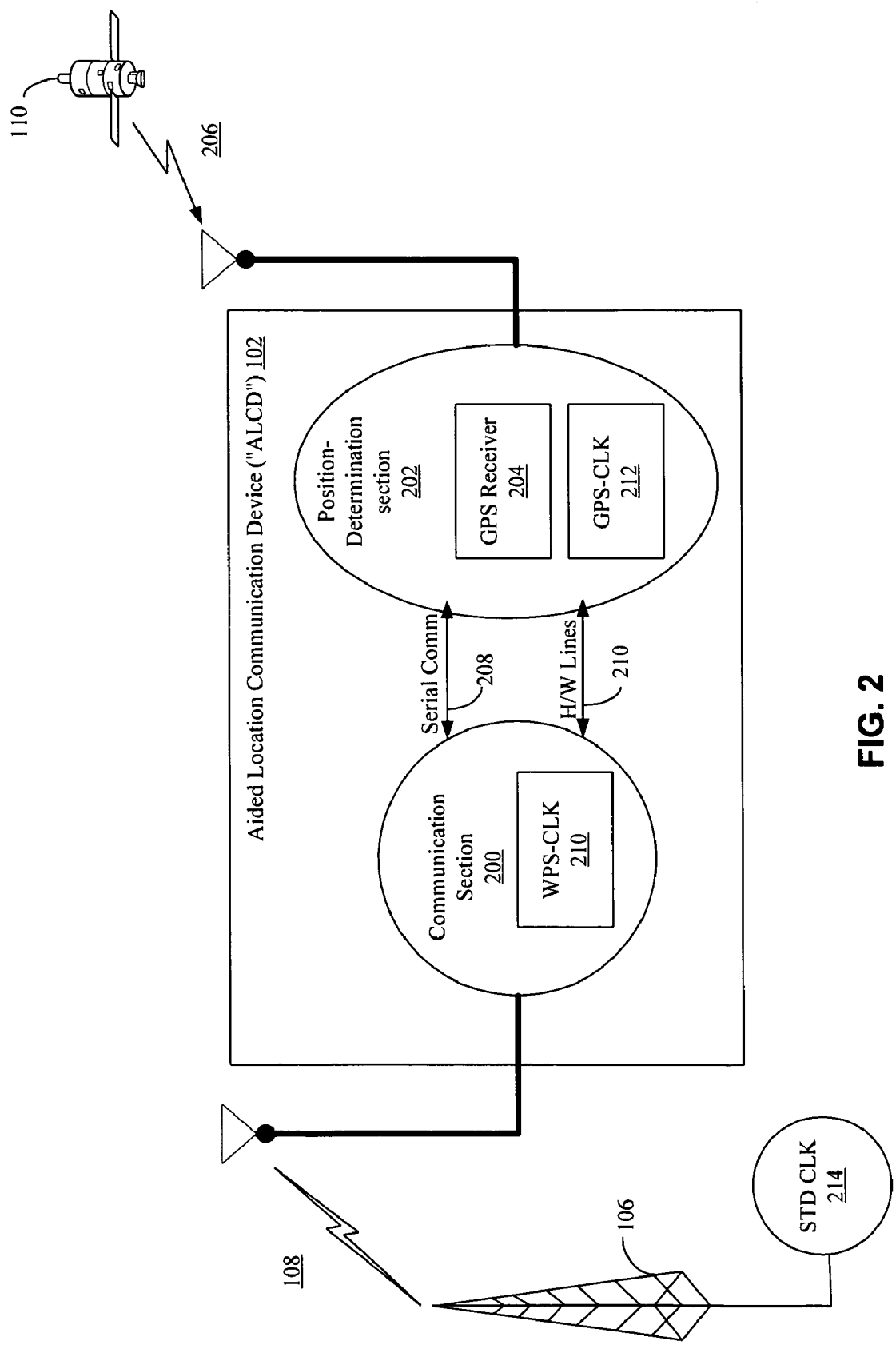
FIG. 2 is a block diagram of an example of an implementation of the ALCD shown in FIG. 1.

FIG. 2 is a block diagram of an example of an implementation of the ALCD 102 shown in FIG. 1. The ALCD 102, FIG. 2, includes both a communication section 200 and a position-determination section 202. The wireless communication section 200 may include a call processing ("CP") section (not shown) that performs the processing functions for the wireless applications and may include a wireless transceiver. For example, in the case of a cellular telephone, the ALCD 102 would include a CP section with a cellular transceiver. The position-determination section 202 includes a GPS receiver 204 for receiving satellite transmissions 206 from a GPS satellite constellation 10. The position-determination section 202 may also include a non-GPS receiver capable or receiving non-GPS location aiding information as described below. The position-determination section 202 performs the position computation functions for the ALCD 102. By integrating the technology of the communication section 200 with that of the position-determination section 202, the ALCD 102 provides two major service systems: that of a wireless device, such as cellular telephone service, and that of the GPS receiver to provide location information of the ALCD 102. It is appreciated by those skilled in the art that this integration provides for numerous advantages including meeting the E911 requirements of the Federal Communication Commission ("FCC").

Within the ALCD 102, or, alternatively, between ALCD 102 and an external accessory (not shown) to ALCD 102, communications between the communication section 200 and position-determination section 202 take place. These communications allow signals to be transferred from the communication section 200 to the position-determination section 202, and typically take place on a serial communications link 208 and hardware lines 210, but other connections may be used also if desired.

As an example, the communication section 200 and the position-determination section 202 may share the same digital processor (not shown) and other circuitry. In such a case, the communication between sections may be made by intertask communication, and certain data transfers, such as any time or frequency transfers between the communication section 200 and the position-determination section 202, would not use hardware lines 208, but would be internal to the circuitry or, potentially, no transfer would be required depending on the circuit design.

Figure 3:
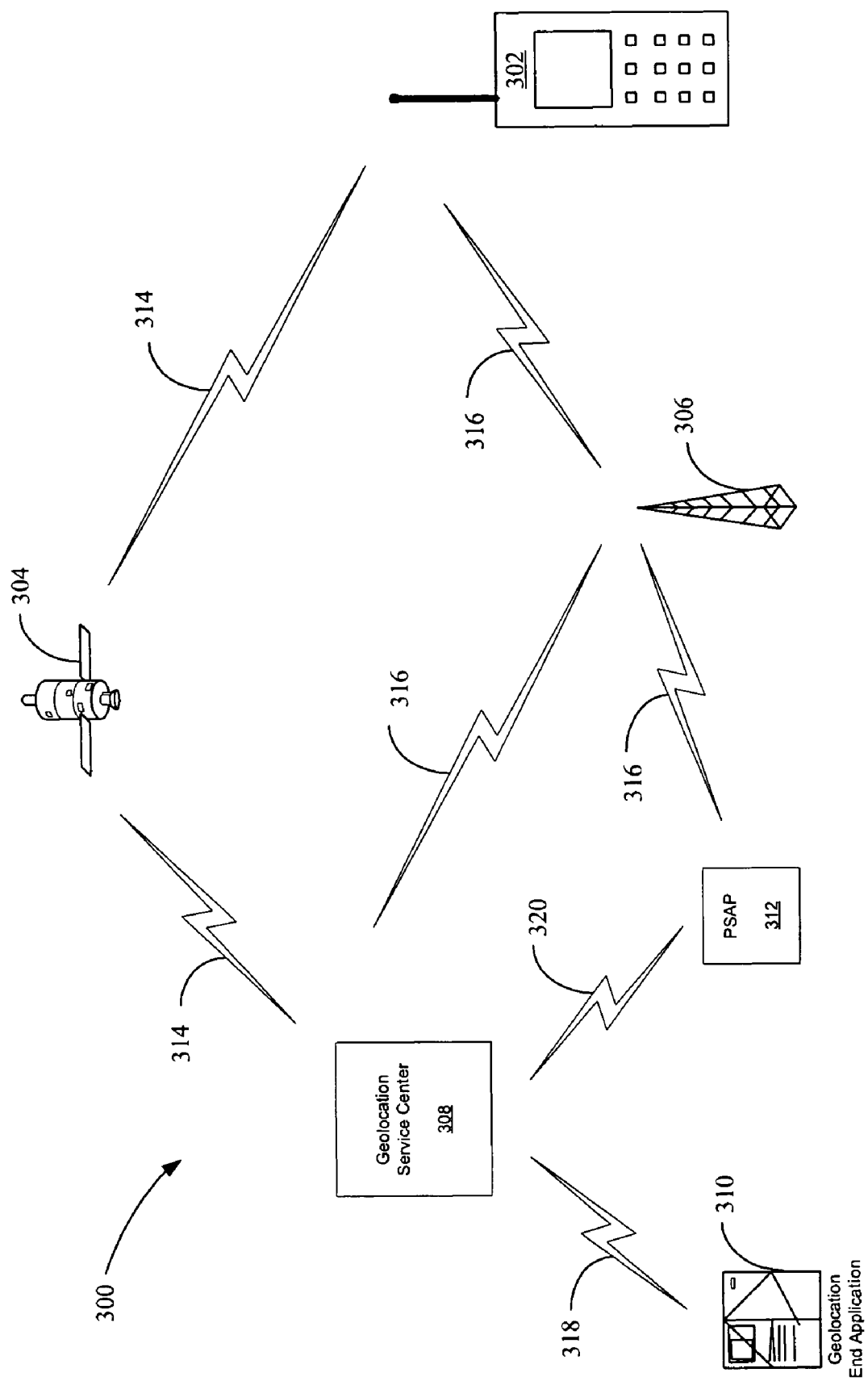
FIG. 3 illustrates an example of an implementation of an architecture for the ALCS shown in FIG. 1.

In FIG. 3, an example of an implementation of ALCS 300 architecture is shown. The ALCS 300 architecture utilizes GPS technology in support of various implementations of the ALCD 302 for the implementation of E911 and geolocation services. By taking advantage of the low cost, low power, high performance and high accuracy GPS receivers and the wireless network communication services, the ALCS 300 provides highly reliable and economical solutions to the ALCD 302. The ALCS 300 supports all types of geolocation services including GPS-standalone mode, GPS-autonomous mode, GPS-network-aided mode, GPS-network-centric mode, reverse-aiding mode, network-based and augmented-aiding modes. The ALCS 300 also accommodates a wide range of wireless communication technologies including CDMA, TDMA, AMP, and even pager systems.

In FIG. 3, an example of implementation of the ALCS system 300 may include a GPS satellite 304 (which is illustrative of the constellation of GPS satellites 304 that are in Earth orbit), the ALCD 302 that includes a GPS receiver, a basestation 306, a geolocation (server) service center 308, a geolocation end application 310, and a Public Safety Answering Point ("PSAP") 312.

In an example of operation, the GPS satellite 304 transmits spread spectrum signals 314 that are received at the ALCD 302 and the geolocation server 308. For ease of illustrative purposes, the other GPS satellites are not shown, however, other GPS satellites also are transmitting signals that are received by the ALCD 302 and the geolocation server 308. If the ALCD 302 receives strong enough signals 314, the GPS receiver in the ALCD 302 may compute the position of the ALCD 302 in a typical fashion of a known GPS system.

However, if the ALCD 302 is not able to receive strong enough signals 314, or is not able to receive signals from enough GPS satellites 302 to autonomously compute the position of the ALCD 302, it may still be able to communicate with basestation 306 via signal path 316. In this example, the basestation 306 may communicate information, via signals 316, to the ALCD 302 to allow the ALCD 302 to compute its location. Alternatively, the basestation 306 may communicate information from the ALCD 302 to the geolocation server 308 to allow the geolocation server 308 to compute the position of the ALCD 302. If the basestation 306 is transferring information to the ALCD 302 to allow the ALCD 302 to compute its position, the process is known as "wireless-aided GPS," whereas when the basestation 306 transfers information from the ALCD 302 to the geolocation server 308 for the geolocation server 308 to compute the position of the ALCD 302, it is known as "network-centric GPS."

The geolocation service center (i.e., the geolocation server) 308 also communicates with the geolocation application 310, via signals 318, and with PSAP 312 via signals 320. These signals 318 and 320 may either be via wireless links or may be through the land-line telephone network or other wire-based networks.

The ALCS 300 may include two major service systems that include the ALCD 302 with the GPS receiver and the geolocation server 308 having geolocation software modules. In addition, there are two types of supporting systems: the basestation ("BS") 306 infrastructure, which provides the network information transfer mechanism, and the PSAP 312 or the geolocation end application 310 system, which may initiate the geolocation network services.

The ALCD 302 may include a typical communication section that performs the CP functions, and a position-determination section for position computation, pseudorange measurement, and other GPS functions performed at the ALCD 302. A serial communication link, or other communications link, performs the communications between the communication section and the position-determination section and a collection of hardware lines may be utilized to transmit signals between the two sections.

Figure 4:
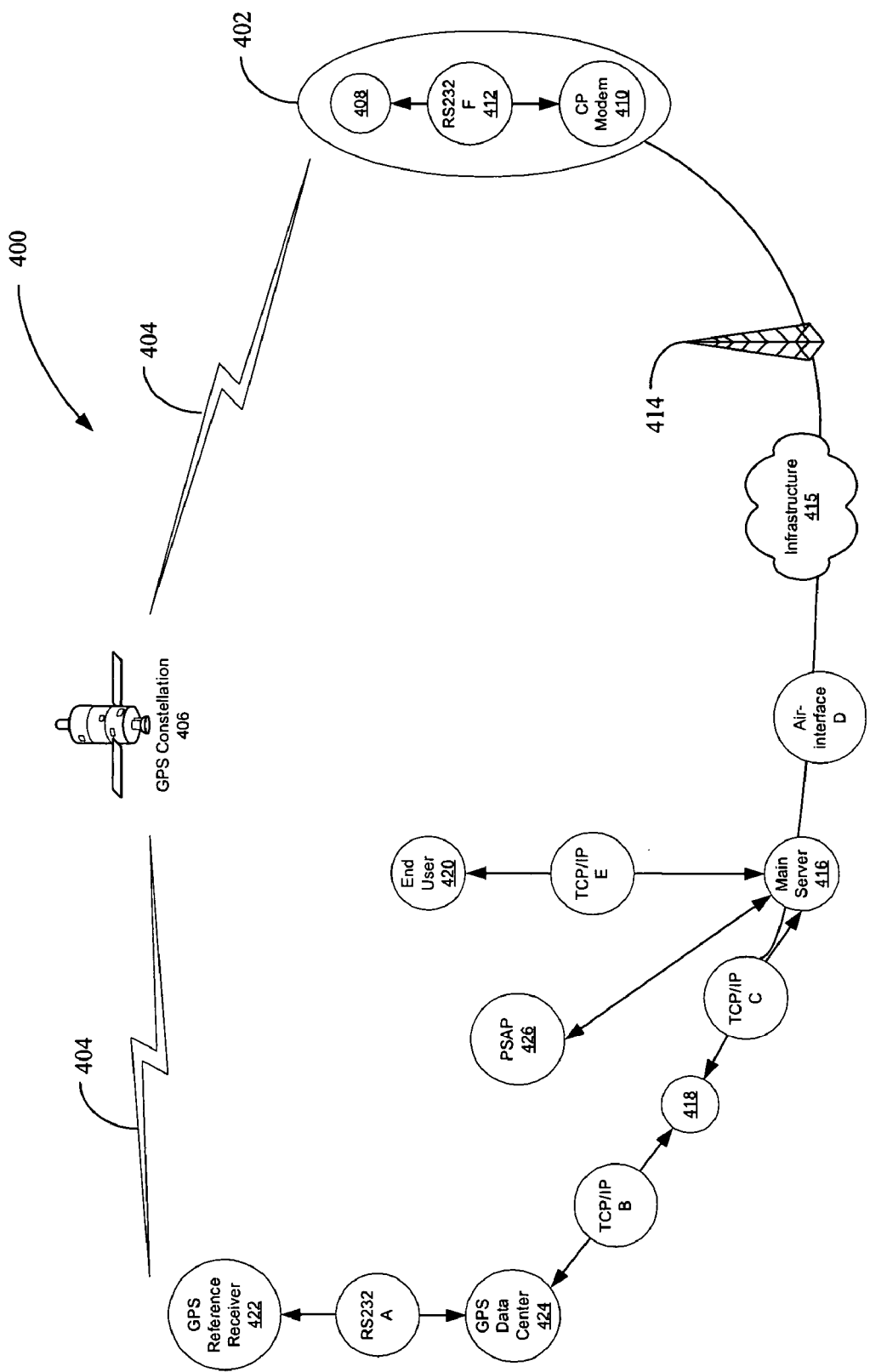
FIG. 4 illustrates another example of an implementation of an architecture for the ALCS shown in FIG. 1.

FIG. 4 illustrates another example of an implementation of an end-to-end system of the ALCS 400. The ALCS 400 shows the ALCD 402 receiving GPS signals 404 from GPS satellite constellation 406. The ALCD 402 includes a position-determination section 408 having a GPS receiver client (not shown) and communication section 410 having a CP section (not shown), connected by, for example, an RS232 data link 412. The communication section 410 communicates with basestation 414, which communicates with a main server 416 via the cellular and/or cellular/land-based telephone network 415. The main server 416 communicates with the geolocation server 418 and the application 420 via land-based or wireless networks, typically using TCP/IP protocols.

The GPS signals 404 are also received by a series of reference receivers 422 that compute the position of the reference receivers 422 and extract data from the GPS signals 404. The extracted data such as time, Doppler, frequency, etc. is sent to a GPS data center 424, for all of the GPS satellites in the GPS constellation 406. When needed, the geolocation server 418 extracts data from the GPS data center 424 for use by the ALCD 402, and transmits the data to the ALCD 402 or the application 420. The main server 416 may also interface to the PSAP 426 if desired, and the main server 416 and the geolocation server 418 may be co-located if desired or necessary.

Depending on the wireless network being used such as cellular, PCS, two-way paging, Specialized Mobile Radio ("SMR"), Short Messaging Service ("SMS"), etc. the physical implementation of the ALCS 400 may vary from that shown in the FIGS. 3 and 4. FIGS. 3 and 4 are for illustrative purposes only, and are not meant to limit the application of the ALCS 400 to other wireless systems. Further, the ALCS 400 may be utilized with hardwired systems such as the landline telephone system, local area networks, etc., without departing from the scope of the present invention.

Figure 5:
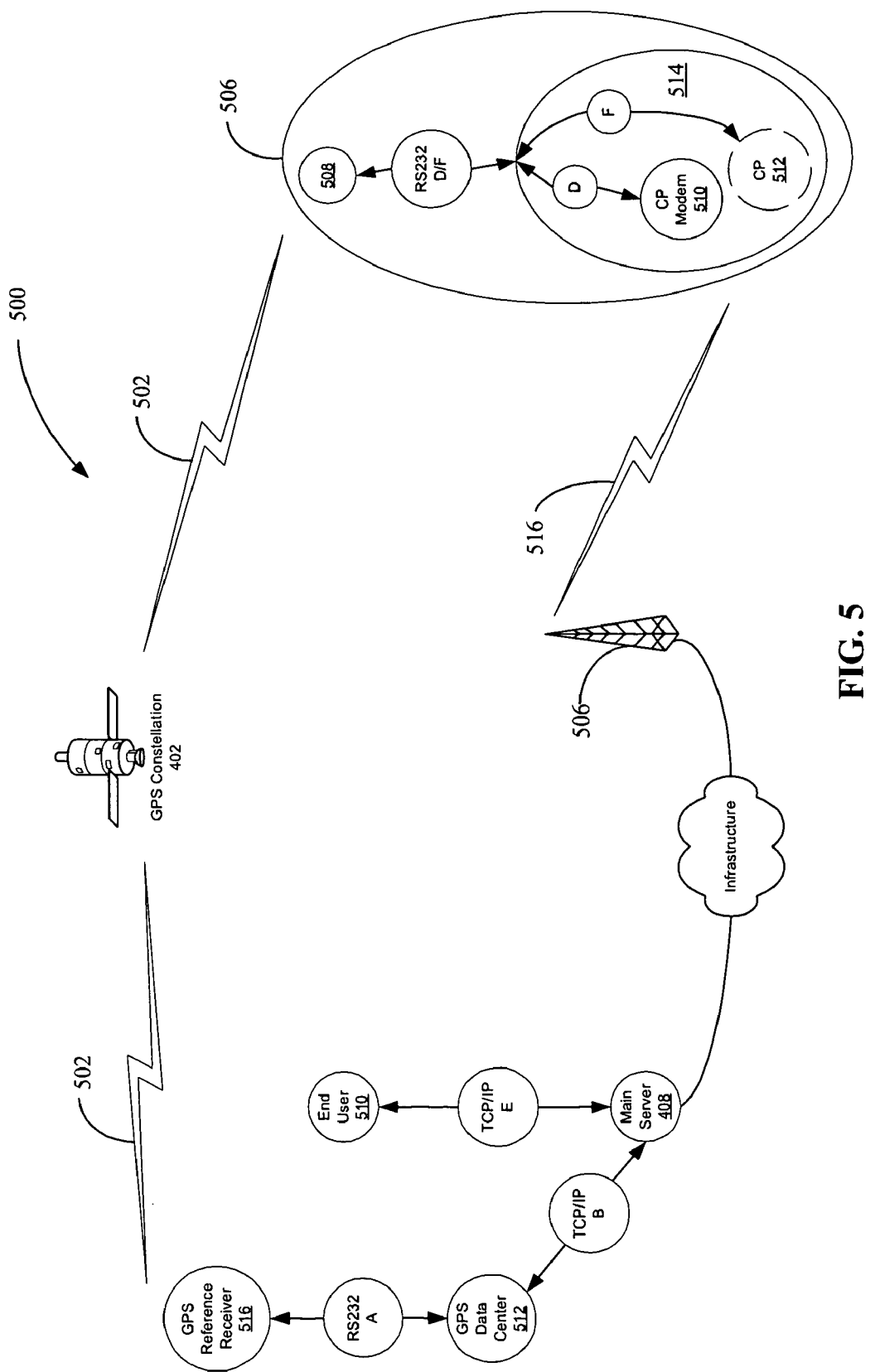
FIG. 5 illustrates another example of an implementation of an architecture for the ALCS shown in FIG. 1.

FIG. 5 illustrates another example of implementation of ALCS 500. The ALCS 500 receives GPS signals 502 from GPS constellation 504. The ALCD 506 may include position-determination section 508 having a GPS receiver, also called the client, a server 510, and a CP section 512. The server 510 and CP 512 may be included in the communication section 514. In the ALCS 500, server 510 is usually known as a "thin server," since it will not have the same capabilities of server (i.e., the communication section 410) described in FIG. 4. The ALCS 500 utilizes GPS reference receiver 516 to also receive signals 502 from GPS constellation 504, and stores the GPS data in data center 518. This information is transmitted to main server 520 when requested by application 522, or by the ALCD 506, which uses server 510 to transmit the data back and forth between the CP section 512 and client 508. The ALCS 500 allows for some aiding data, such as ephemeris, to be stored in the ALCD 506 at the server 510 and then provided to the client 508 on demand.

Multi-Mode GPS Operation with Wireless Networks

As described above, the ALCS may be operated in different modes depending on a number of variables such as signal strength, operator intervention, type of services desired or requested, performance expectation, e.g., TTFF of a few seconds vs. tens of seconds, etc. The operation of each mode is described below.

Standalone Mode

In GPS-standalone mode, the GPS receiver of the position-determination section located in the ALCD 304 operates independently from the wireless communications network that is in signal-communication with the ALCD 304 via the basestation 306 and signal-path 316. The position-determination section acquires the GPS signals 314, and utilizes the signals 314 to determine the location of the ALCD 304. The position-determination section also utilizes the GPS signals 314 for tracking, and, if desired, navigation functions. The determined position of the ALCD 304 is utilized internally to the ALCD 304.

Autonomous Mode

In GPS-autonomous mode, the position of the ALCD 304 is computed in a similar manner as in GPS-standalone mode, e.g., by the position-determination section in ALCD 304 without any assistance from the cellular or other communication networks. However, instead of utilizing the determined position of the ALCD 304 internal to ALCD 304, in the GPS-autonomous mode, the ALCD 304 transmits the determined position of the ALCD 304 back to the communications network (e.g., the geolocation server 308, application 310, PSAP 312, etc.) through the wireless communications network.

Network Aided Mode

A different mode of operation may be implemented in the ACLS 300 such that the position-determination section in the ALCD 302 utilizes the wireless communications network to deliver some of the position information to the position-determination section to "aid" the GPS receiver in the acquisition, tracking, and navigation functions. Such information includes almanac or sub-almanac information, coarse position information, Doppler data, in-view GPS satellite positions, time and frequency aid, received wireless radio signal strength (to obtain by analogy an idea of what to expect for the GPS signal strength), or other aids that will aid the GPS receiver in acquisition, navigation, or tracking. Such situations may occur when the ALCD 302 has a limited view of the sky, or cannot acquire enough GPS signals on its own, because the ALCD 302 is blocked or otherwise unable to acquire the GPS satellite signals, or cannot track the GPS satellites because of multipath problems. Furthermore, such situations may also be initiated by the user conditioned upon a given event such as when an E911 call is placed from the ALCD 302, the user desires a very short TTFF or that additional network information is included in the GPS calculation for increased accuracy, or other reasons.

The GPS-network aided approach differs from the GPS-network centric (also called the network assisted mode in other literature) approach because in the GPS-network aided approach, the position-determination section could, eventually, obtain the position and tracking information needed to locate the ALCD 302 by itself. The GPS-network centric approach, as discussed in Krasner, cannot determine the position of a mobile device solely using the GPS information acquired from outside the wireless network, because the position calculation is done inside of the wireless network at the basestation, instead of in the ALCD 302.

Further, the GPS-network aided approach, as described with respect ALCS 300 allows for switching between the GPS-standalone mode, GPS-autonomous mode, or other modes, once the initial acquisition has been made. The GPS-network aided mode and architecture of the ALCS 300 allows for the tracking, e.g., continuous update of user position to be done in GPS-autonomous mode or GPS-standalone mode even in weak signal environments. The GPS-network assisted architecture of Krasner typically continues to depend on the network aid to calculate subsequent position.

The GPS-network aided mode is typically only utilized for acquisition of the GPS signal in weak signal environments. Once the GPS signal is acquired, the GPS receiver of the ALCD 302 is capable of tracking the GPS satellite 304 without aid from the network. The GPS-network assisted mode of Krasner requires the network to assist the GPS receiver in a mobile device for tracking purposes as well as for acquisition.

Network-Based Mode

A network-based mode may also be utilized for situations where the GPS receiver cannot receive any GPS signals. As such, the ALCD 302 is completely dependent on the wireless communications network to obtain any positioning information, and as such, is "centered" upon the information delivered by the wireless communications network. Typically, network-based modes compute position without using GPS or other satellite information. Position of the ALCD 302 is derived from network resources, e.g., cellular transmitter towers and TDOA techniques. Therefore, the network-based mode is useful when the ALCD 302 is in an area where it cannot receive GPS or other positioning system information to determine ALCD 302 position.

Reverse-Aiding Mode

The reverse-aiding mode may be utilize when the GPS receiver in the ALCD 302 again receives a strong GPS signal, has recent ephemeris or almanac data, or when an exact position is not required. Similar to the GPS-autonomous mode and GPS-standalone mode, in the reverse-aided mode the position-determination section does not receive any aiding and therefore operates independently from any available external networks or external aiding devices. In the reverse-aiding mode, the position-determination section acquires GPS satellite signals, and utilizes those GPS signals to determine the location of the ALCD 302. The position-determination section may also use the GPS satellite signals for tracking, and, if desired, navigation functions. However, instead of using the determined position internally to the ALCD 302, in the reverse-aiding mode, the ALCD 302 transmits various types of measured information at the GPS receiver to a communication section of a wireless device and/or an external network such as a wireless communications network for use within the wireless communications network.

The reverse-aiding mode may be utilized to supply location information, precise time, velocity, heading and a reference GPS clock because location, velocity and heading are very useful for cell planning and power management.

Reverse-Aiding for Cell Planning and Frequency-Reuse

In cellular communication systems, the reverse-aiding mode is useful for cell planning and increasing frequency-reuse. As cellular communication systems mature, they serve more subscribers, which leads to either adding more radio channels in a cell or adding new cells to a cellular system. The reverse-aiding mode allows additional frequency reuse or code reuse within a cell, since the wireless communications system may utilize smart antennas (such as antennas utilizing phased array technology) to beam-steer or beam-form a shaped antenna transmission beam that is centered upon each wireless communications device.

Figure 6:
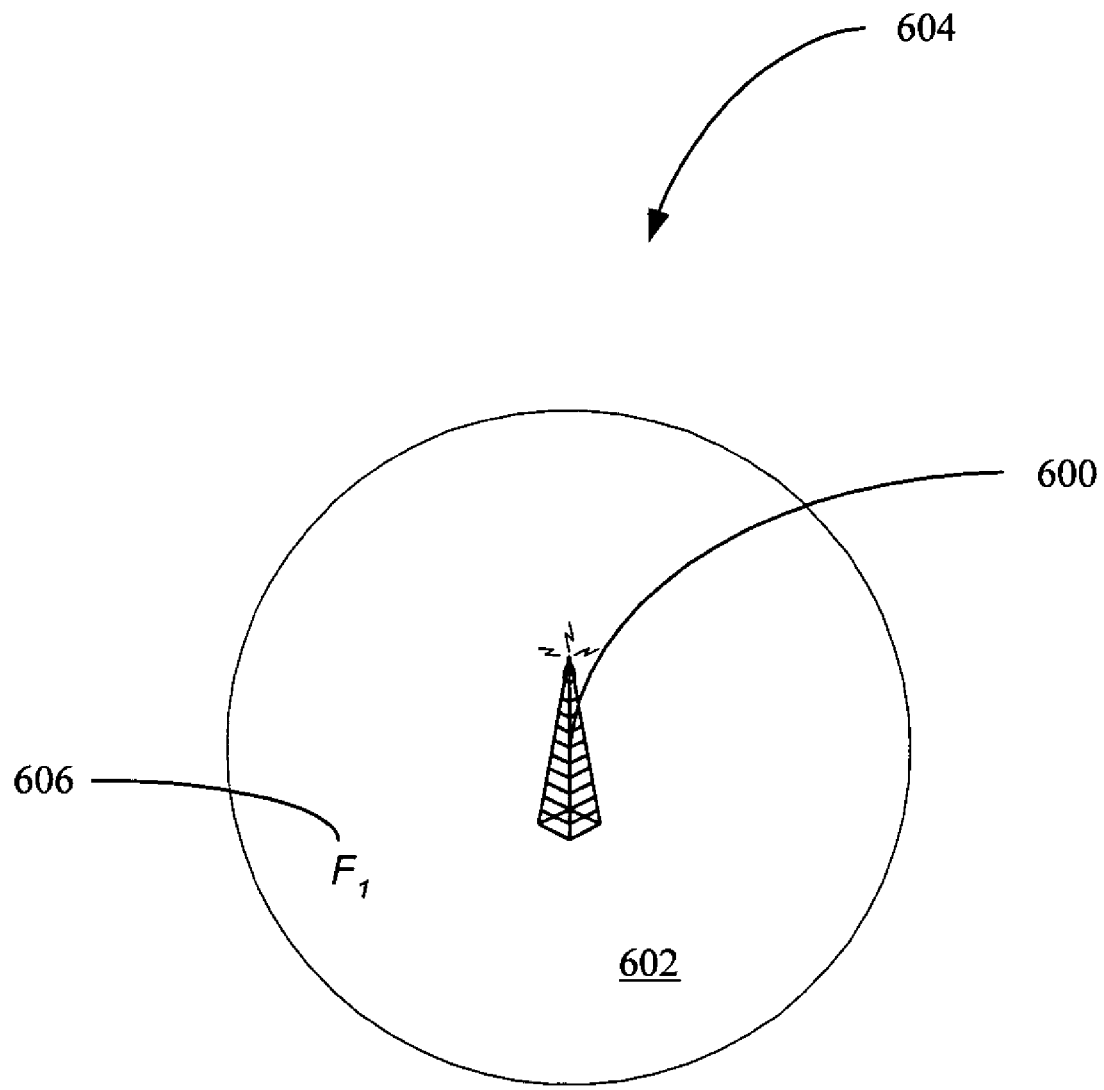
FIG. 6 illustrates a basestation located within a cell in an example of a cellular communication system.

FIG. 6 illustrates a basestation 600 located within a cell 602 in an example of a cellular communication system 604. In the cellular communication system 604, a high-power transmitter (not shown) at the basestation 600 typically serves a large geographic area such as the entire cell 602. Because each radio channel $F_1$ 606 transmitted by the high-power transmitter usually requires a certain bandwidth, the resulting limited number of radio channels keeps the serving capacity of the cellular communication system 604 low and therefore the customer demand for the few available channels high.

To increase the number of radio channels where the frequency spectrum allocation is limited, cellular providers typically reuse the transmitted frequencies. The reuse of these frequencies is possible because the radio channel signal strength decreases exponentially with distance and subscribers who are far enough apart can typically utilize the same radio channel frequency without interference. Therefore, to minimize interference in this way, cellular system planners typically positioned the cell sites that use the same radio channel frequency far away from each other.

However, in order to add more radio channels, cellular systems typically use several techniques in addition to strategically locating cell sites that utilize the same frequencies. Directional antennas and underlay/overlay transmit patterns usually improve signal quality within cells by focusing radio signals into one area of the cell and reducing the interference in other areas. The reduced interference allows more frequency reuse and therefore directional antennas may be utilized to sector a cell in to wedges so that only a portion of the cell (e.g., ⅓, or 120 degrees) is utilized for a single radio channel. Such sectoring usually reduces interference with the other cells in the area.

Figure 7:
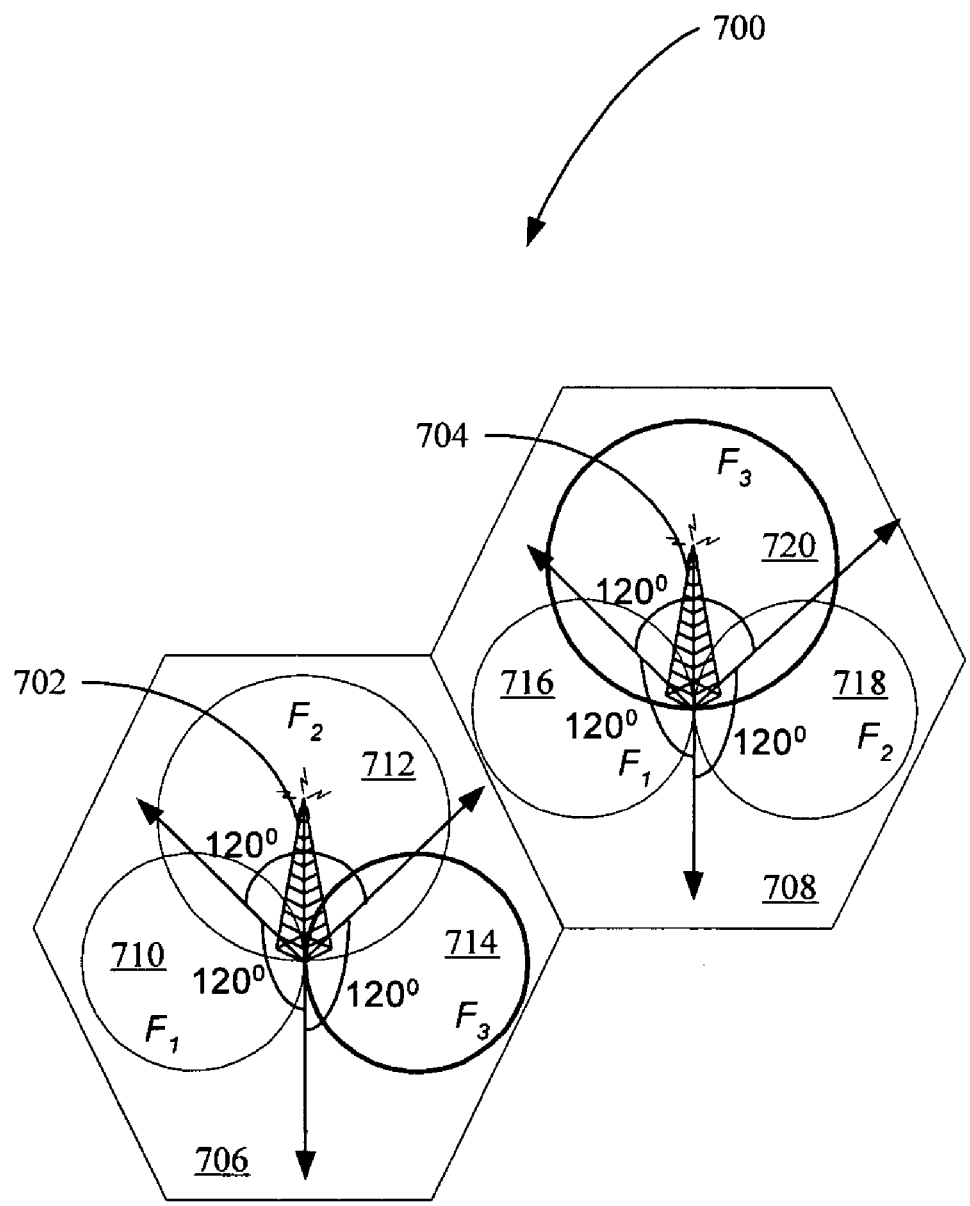
FIG. 7 illustrates an example of an implementation of a cellular communication system utilizing directional antennas on two example basestations and within two cells and utilizing three frequencies.

FIG. 7 shows an example of an implementation of a cellular system 700 utilizing directional antennas on two example basestations 702 and 704 within two cells 706 and 708 where the two basestations 702 and 704 utilize three total frequencies $F_1$, $F_2$ and $F_3$. Cells 706 and 708 are divided up into sectors 710, 712, 714, 716, 718 and 720 respectively where sector 710 has frequency $F_1$, 712 has frequency $F_2$, 714 has frequency $F_3$, 716 has frequency $F_1$, 718 has frequency $F_2$, and 720 has frequency $F_3$.

The allocation of the frequencies in the sectors may be chosen utilizing the standard channel spacing procedures. Typically, channel spacing refers to the actual bandwidth space that is allocated for every cellular channel out of the amount of cellular spectrum. Usually, each cell basestation is assigned a particular number of cellular channels. This group of channels is known as a channel set. A frequency-reuse plan (such as a "N4" or "N7" plan) utilizes a number of channel sets in the plan. As an example, in an N=7 frequency-reuse plan (i.e., N7 plan), there are 21 channels sets, with an average of 15 to 20 paired channels assigned per set. There are 21 channel sets because channel sets are assigned alphanumerically in groups of three, using the N=7 reuse format.

Figure 8:
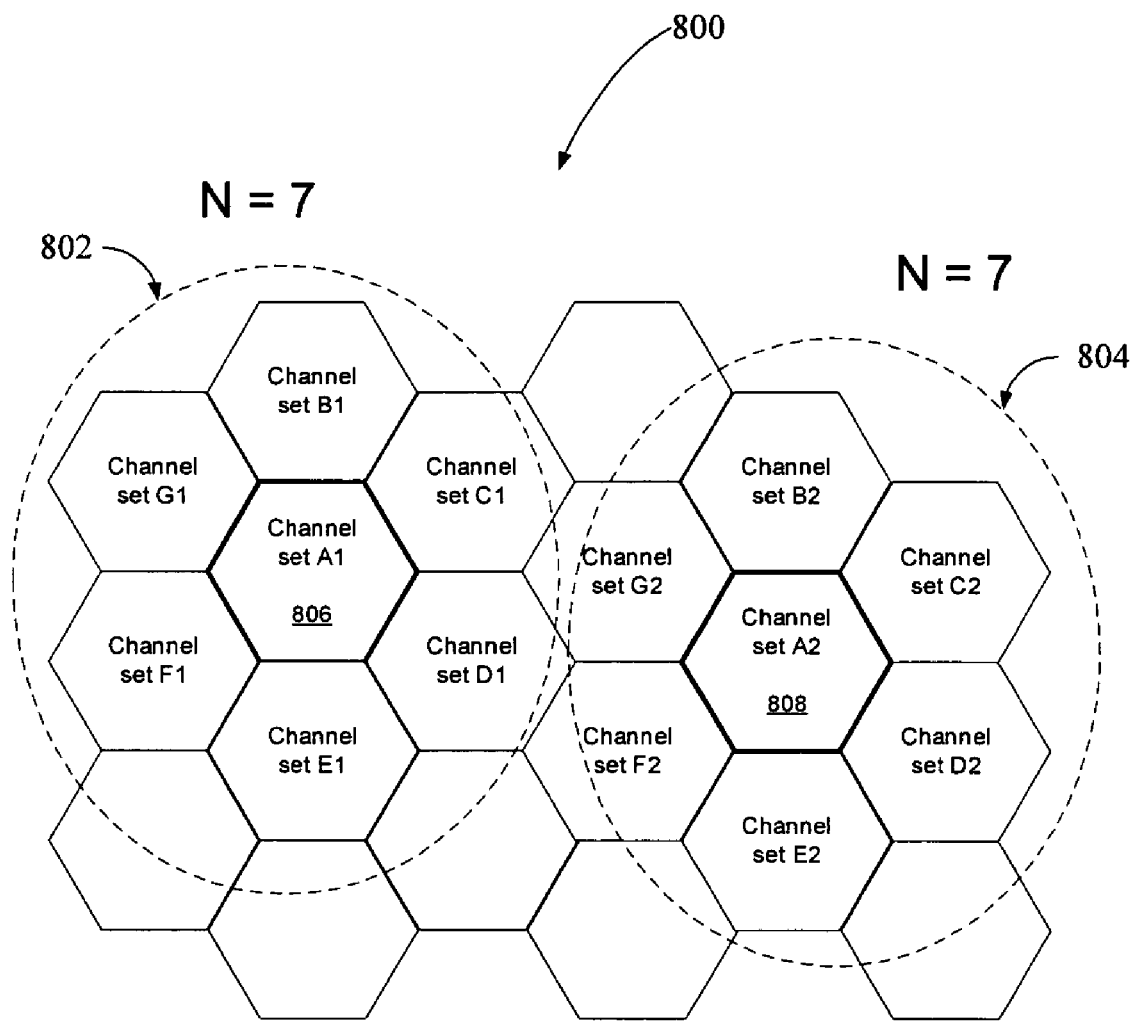
FIG. 8 illustrates an example of a typically N7 frequency-reuse plan having 7 channels assigned to numerous cells.

FIG. 8 shows a typically N7 frequency-reuse plan 800 having 7 channels assigned as A, B, C, D, E, F and G to numerous cells. Because of convention, channel sets are typically assigned on an alphanumeric basis. The numerous cells are arranged in two clusters of cells 802 and 804 centered around center cells 806 and 808, respectively.

Reverse-Aiding for Increasing Frequency Capacity

Similar to the advantage for frequency-reuse, the reverse-aiding mode is also useful for increasing the frequency capacity utilized within a cellular communication system. With the advent of "smarter" antennas such as phase-array and general beam-steering antennas, cellular communication systems may include antennas that are capable of being directed to a mobile handset while steering the antenna beam in a fashion that maintains a communication link between the mobile handset and the basestation while the mobile handset is moving.

The reverse-aiding mode allows a GPS receiver in the ALCD 302 to determine position information about its location, velocity and heading and pass that information to the communication section of the ALCD 302. The communication section of the ALCD 302 may then transmit this information to the basestation via a communication channel such as a reverse access control channel.

Knowing the position information of the ALCD 302, the basestation may then utilize a smart antenna to transmit to the ALCD 302 utilizing an antenna beam that has a narrow beamwidth directed towards the ALCD 302. This antenna beam may them be steered by the basestation based on the received velocity and heading information of the ALCD 302 in order to maintain signal communication with the moving ALCD 302. It is appreciated by those skilled in the art that the antenna beam may be created and steered utilizing known antenna techniques such as phased array technology.

Figure 9:
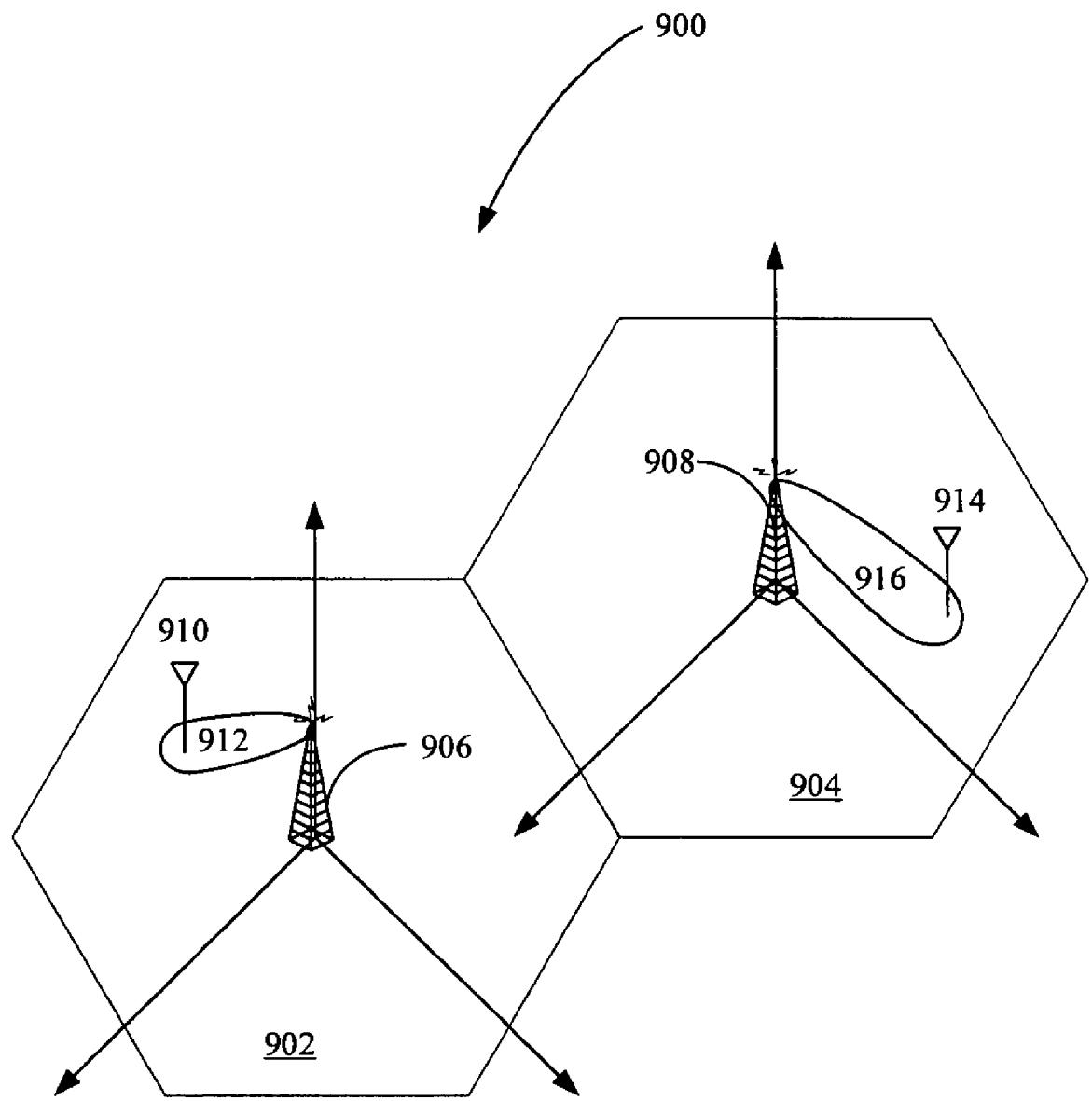
FIG. 9 illustrates an example of an implementation of the ALCS of FIG. 1 utilizing a reverse-aiding mode.

FIG. 9 illustrates an example of an implementation of the ALCS 900 utilizing a reverse-aiding mode. As an example, the ALCS 900 may utilize the reverse-aiding mode with two cells 902 and 904 having basestations 906 and 908, respectfully. The basestation 906 may be in signal communication with an ALCD 910 via antenna beam 912 and basestation 908 is in signal communication with second ALCD 914 via antenna beam 916.

In FIG. 9, a first position-determination section located within the first ALCD 910 determines the position of the first ALCD 910. The first communication section of the first ALCD 910 then obtains the position information from the first position-determination section and passes it to the first basestation 906. Similarly, a second first position-determination section located within the second ALCD 914 determines the position of the second ALCD 914. The second communication section of the second ALCD 914 then obtains the position information from the second position-determination section and passes it to the second basestation 908. The first basestation 906, utilizing the position information of first ALCD 910, then adjusts the first antenna beam 912 to directively aim at the ALCD 910. As the ALCD 910 moves within the cell 902, the first basestation 906, utilizing the position information of the first ALCD 910 including the heading and velocity of the first ALCD 910 movement, steers the first antenna beam 912 to maintain signal communication with the first ALCD 910.

Similarly, the second basestation 908, utilizing the position information of second ALCD 914, then adjusts the second antenna beam 916 to directively aim at the second ALCD 914. As the second ALCD 914 moves within the cell 904, the second basestation 908, utilizing the position information of the second ALCD 914 including the heading and velocity of the second ALCD 914 movement, steers the second antenna beam 916 to maintain signal communication with the second ALCD 914.

Reverse-Aiding for Increasing Frequency Capacity Through Space Domain Multiplexing The reverse-aiding mode also may increase the frequency capacity within a cell through space-domain multiplexing ("SDM"). The reverse-aiding mode allows a basestation to divide up a cell by transmitting multiple antenna beams from the basestation to multiple ALCDs located within the cell. These multiple antenna beams may be varied in transmission range and steered to follow the movements of the ALCDs. In this way, the reverse-aiding mode allows the basestation to utilize the space-domain within the cell as a way of isolating the multiple transmissions to the multiple ALCDs in the cell. Similar to time, frequency, and code-domain multiplexing, SDM allows for an increase in capacity of frequencies being transmitted within the cell.

Figure 10:
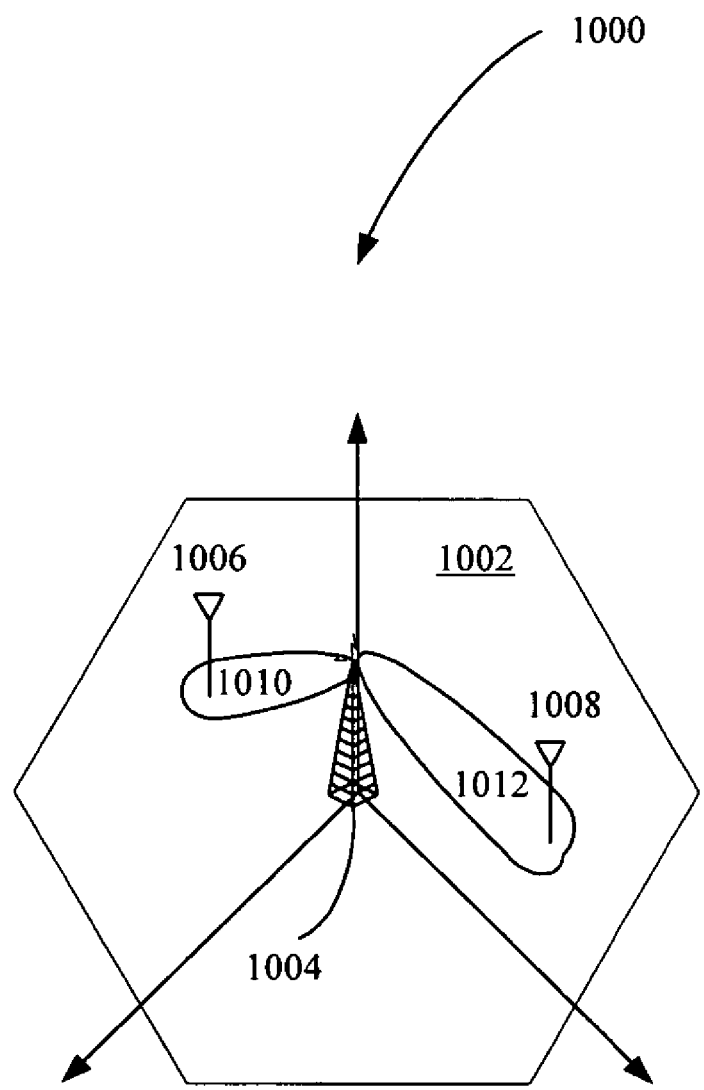
FIG. 10 illustrates an example of an implementation of the ALCS of FIG. 1 utilizing the reverse-aiding mode to increase the frequency capacity within a cell through SDM.

FIG. 10 illustrates an example of an implementation of the ALCS 1000 utilizing the reverse-aiding mode to increase the frequency capacity within a cell 1002 through SDM. As an example, the ALCS 1000 is shown having the cell 1002 and a basestation 1004. The basestation 1004 may be in communication with two ALCDs 1006 and 1008 via antenna beams 1010 and 1012. As the ALCDs 1006 and 1008 move along the cell 1002 the basestation 1004 will steer and adjust the transmission power levels of the antenna beams 1010 and 1012 to follow the movements of the ALCDs 1006 and 1008.

Figure 11:
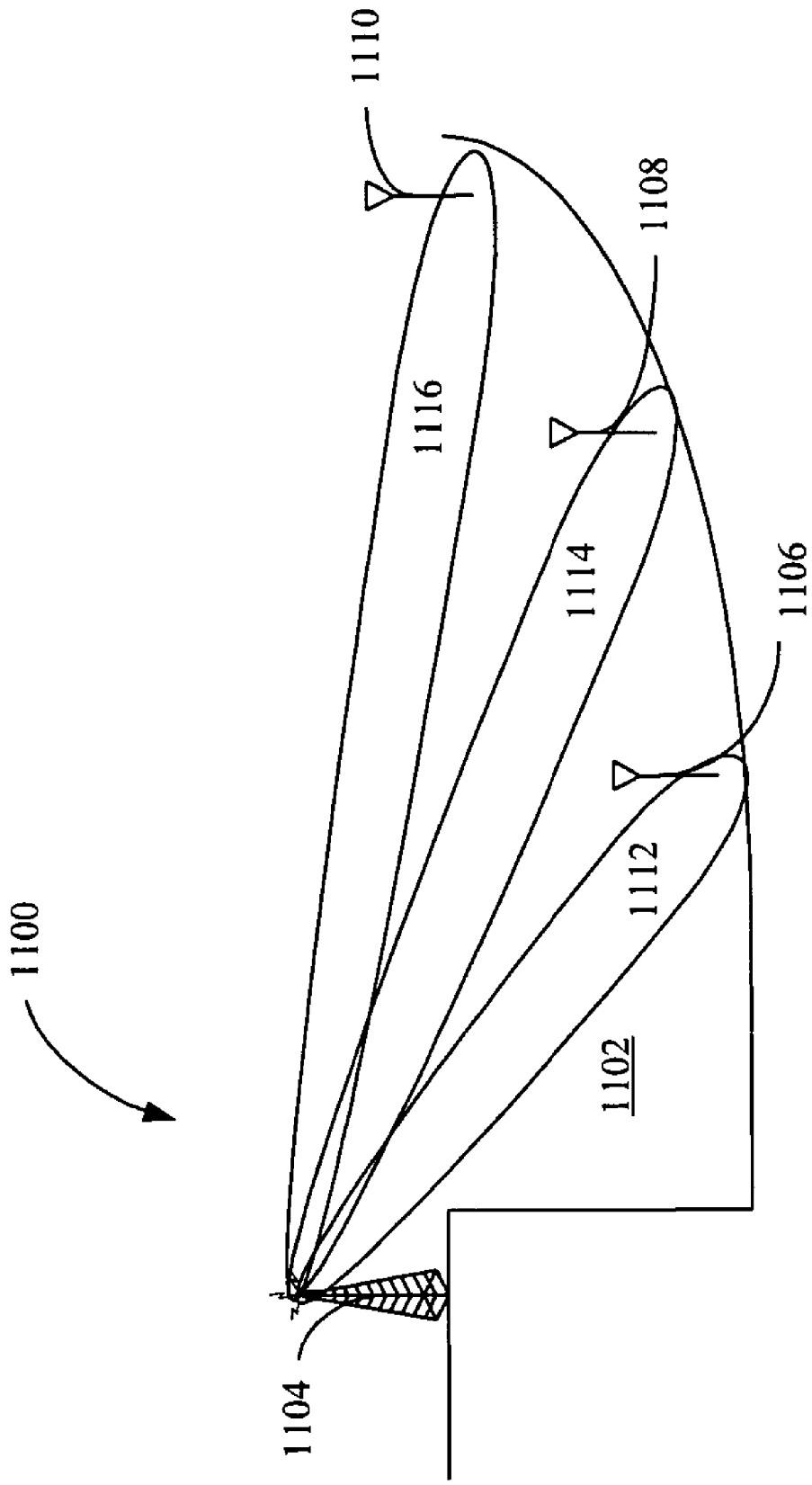
FIG. 11 illustrates another example of an implementation of the ALCS 1100 utilizing the reverse-aiding mode to increase the frequency capacity within a cell through SDM.

FIG. 11 illustrates another example of an implementation of the ALCS 1100 utilizing the reverse-aiding mode to increase the frequency capacity within a cell 1102 through SDM. As an example, the ALCS 1100 is shown including the cell 1102 and a basestation 1104. The basestation 1104 may be in communication with ALCDs 1106, 1108 and 1110 via antenna beams 1112, 1114 and 1116, respectively. The basestation 1104 may be located at a higher elevation than the three ALCDs 1106, 1108 and 1110. In an example of operation, as the ALCDs 1106, 1108 and 1110 move along the cell 1102, the basestation 1104 steers and adjusts the transmission power levels of the antenna beams 1112, 1114 and 1116 to follow the movements of the ALCDs 1106, 1108 and 1110.

As mentioned earlier, based on the distance of the ALCDs 1106, 1108 and 1110 from the basestation 1104, the basestation 1104 may vary the amount of power that it utilizes in transmitting to the ALCDs 1106, 1108 and 1110. The reverse-aiding mode also may be utilized to help determine when to switch to another basestation (not shown) by using the location of the ALCDs 1106, 1108 and 1110. (i.e., GPS-aided basestation hand-over).

Reverse-Aiding for Power Management

The reverse-aiding mode in the ALCS is useful also for power management because the reverse-aiding mode allows a basestation to vary the transmission power based on the motion of the ALCD. The reverse-aiding mode allows for lower transmitter power to be utilized by the basestation transmitter, as well as lower power from the ALCD, because the formed or steered antenna beam typically has more gain than an omnidirectional beam pattern. Therefore, the reverse-aiding mode feature helps to optimize the communications links and increase the capacity of wireless communications system basestations, which, in CDMA networks is very useful, since the capacity of CDMA networks typically are limited by the noise floor, which increases as more users are placed on the network, not by the code efficiency.

Returning to FIG. 9, the basestations 906 and 908 may vary the transmission power of the antenna beams 912 and 916 as the ALCDs 910 and 914 move along the cells 902 and 904. As the ALCDs 910 and 914 move closer to the basestations 906 and 908, the basestations 906 and 908 may reduce the transmission power of the antenna beams 912 and 916. As the ALCDs 910 and 914 move farther from the basestations 906 and 908, the basestations 906 and 908 may increase the transmission power of the antenna beams 912 and 916.

Reverse-Aiding for Accelerating Acquisition

The reverse-aiding mode may also be utilized in the ALCS for accelerating the acquisition and code synchronization onto an external network such as a wireless network by providing very accurate absolute time and frequency references.

Once the GPS receiver in a ALCD is locked on to the GPS signals from the GPS constellation of GPS satellites, the GPS clock in the GPS receiver will be very stable with values approximately equal to 0.01 to 0.001 parts-per-million ("ppm"). In contrast, the CP clock in a typical call processing section in the mobile device (such as a cellular telephone) will at best have approximately 0.10 ppm, which is typical for many basestation clocks. As a result, by allowing the GPS clock frequency reference to aid the CP clock in the communication section of the ALCD, the ALCS utilizing the reverse-aiding mode allows the CP clock in the ALCD to be much more stable and accurate than without reverse-aiding, which resulting in faster acquisition times for the position-determination section of the ALCD.

Reverse-Aiding for Mobile-to-Mobile Aiding

Figure 12:
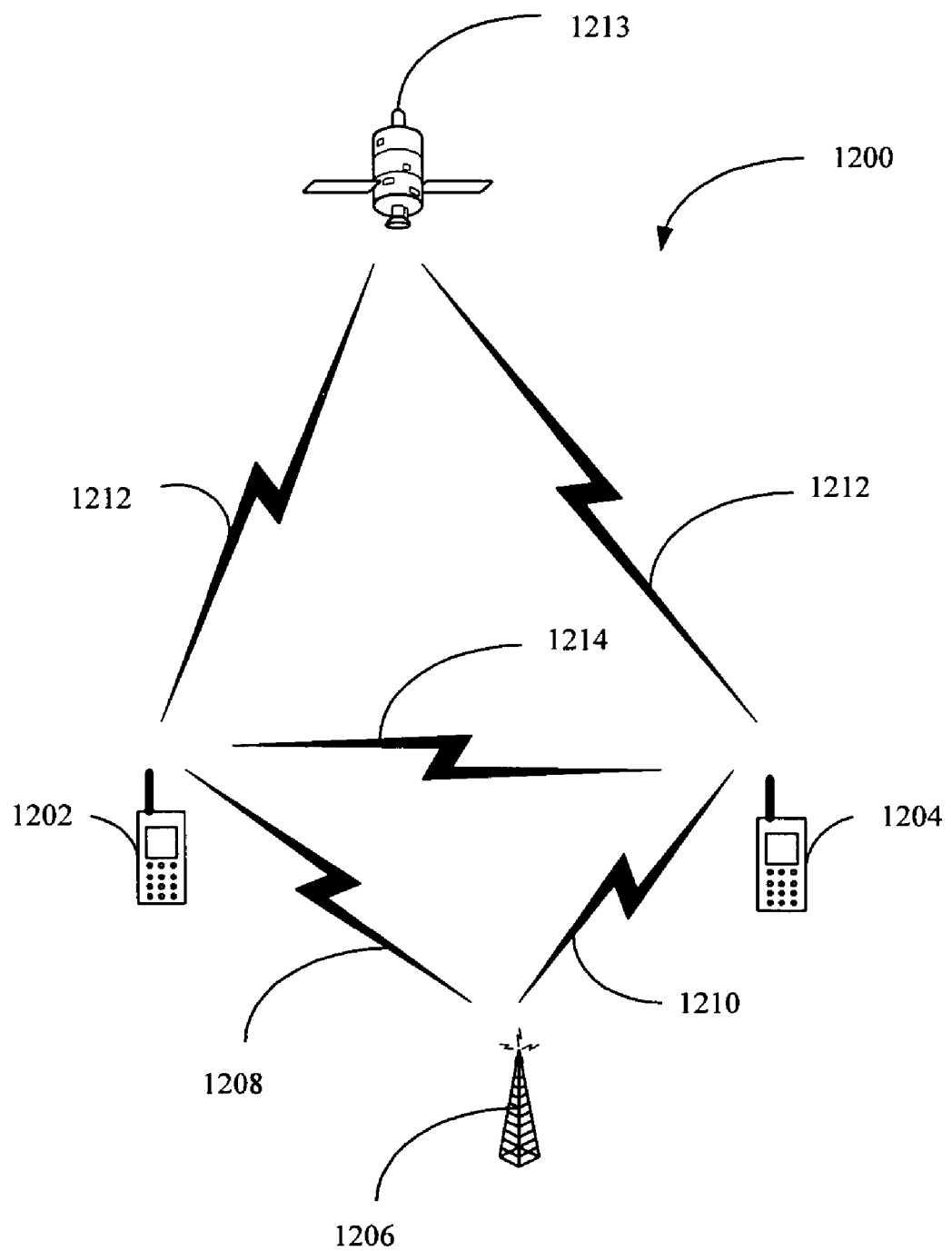
FIG. 12 illustrates an example of an implementation of the ALCS 1200 utilizing the reverse-aiding mode mobile to mobile aiding.

FIG. 12 illustrates another example of an implementation of the ALCS 1200 utilizing the reverse-aiding mode mobile to mobile aiding. As an example, the ALCS 1200 would allow a first ALCD 1202 to aid a second ALCD 1204, using the network 1206 only as a communication medium (via signal-paths 1208 and 1210), where the first ALCD 1202 receives absolute-time information, measures the difference between network time and GPS-time (via GPS-signal 1212) from the GPS constellation 1213, and sends the information to the network 1206 via signal-path 1208. The second ALCD 1204 requesting GPS aiding information will receive the GPS-time-versus-network-time difference from the first ALCD 1202 (via signal-paths 1208 and 1210 and the network 1206), and will correct the network time of this information to obtain GPS-time to help in its own GPS acquisition process.

The reverse-aiding mode may also be utilized in the ALCS 1200 from the first ALCD 1202 to the second ALCD 1204 for frequency transfer, where the frequency error measured between network-frequency and GPS-frequency in first ALCD 1202 is sent to the network 1206, and sent to a new mobile (i.e., the second ALCD 1204) as part of the assistance information. This process may be implemented as a control command that is broadcast by the basestation of the network 1206.

Additionally, the reverse-aiding mode allows for direct GPS aiding from the first ALCD 1202 to the second ALCD 1204 in the ALCS 1200 without utilizing a server (at the network 1206). Direct GPS aiding may be utilized without intervention of a server (at the network 1206) momentarily storing assistance information before retransmitting to the next user at another ALCD that requests aiding. As an example, the first ALCD 1202 having acquired a position, valid ephemeris and possibly network-time and frequency-error-versus-GPS, may transfer this information to any other ALCD in the same vicinity via the basestation of the network 1206 or a region via the MSC 1214.

Reverse-Aiding for Assisting the Network

The reverse-aiding mode in the ALCS may also be utilized for wireless network monitoring, where the position information, alongside with the wireless signal strength, or any position related information, may be collected from every ALCD requesting assistance, at a central place in the network, to continuously monitor the cell coverage area, the amount of traffic within a single cell, where the traffic is concentrated, what are the areas of bad wireless reception, to help in the decisions of adding new base stations, or relocating them. The quality of service may be monitored in real-time by all the ALCD utilized in the area.

The reverse-aiding mode in the ALCS also allows the external network, receiving redundant time and/or frequency reference information from several ALCD in the same area for different points in time, to model the network time offset and frequency drift, and predict its value in the future. This way, the network may provide timing assistance information to a new ALCD, even after a period where no information is received from any ALCD.

The reverse-aiding mode in the ALCS may also be utilized to correct multipath problems at the client in the ALCD, because the terrestrial based wireless communications network may assist in the modeling of the multipath and/or provide modeling tools to help correct the multipath reception problems at the client given the initial position of the ALCD.

Furthermore, the reverse-aiding mode in the ALCS allows the utilization of velocity information from a GPS receiver in the ALCD to assist the wireless communication system in aligning the Phase Locked Loop ("PLL") to address problems associated with ALCD motion. In particular, the reverse-aiding mode may increase the effective wireless cell radius by guiding the wireless tracking loops using the absolute ALCD velocity information from position-determination section, and thus allowing wireless operation at lower radio signal strengths.

Augmented-Autonomous Mode

If the external network is unable to deliver the reliability required, or the network does not have aiding capabilities, the ALCS may use other modes or other sources of information to augment the GPS-autonomous or GPS-standalone mode, in an operational mode called augmented-autonomous mode. The augmented-autonomous mode may be utilized with Bluetooth, Institute of Electrical and Electronic Engineers ("IEEE") 802.11 (generally known as "Wi-Fi") and/or other sensors such as pressure, accelerometers, or gyros to provide the ALCD with aids outside of the network being utilized for communications. For example the augmented-autonomous mode may utilize Bluetooth transmitters in every floor of a high-rise building sending the Bluetooth transmitter's location and floor information to the ALCD and this 'augmented information' will be sent in case GPS signals cannot be acquired by the ALCD inside the building to deliver positioning data. Furthermore, the augmented-autonomous mode allows for the ALCD to switch from GPS-standalone mode to another mode, e.g., aided mode, GPS-network centric mode, etc., when a predetermined event occurs. This predetermined event may include the lapse of a predetermined amount of time without acquisition of a GPS satellite signal, a predetermined number of seconds or minutes, etc., where the ALCD is unable to receive any GPS signals, power cycling of the device, etc.

Figure 13:
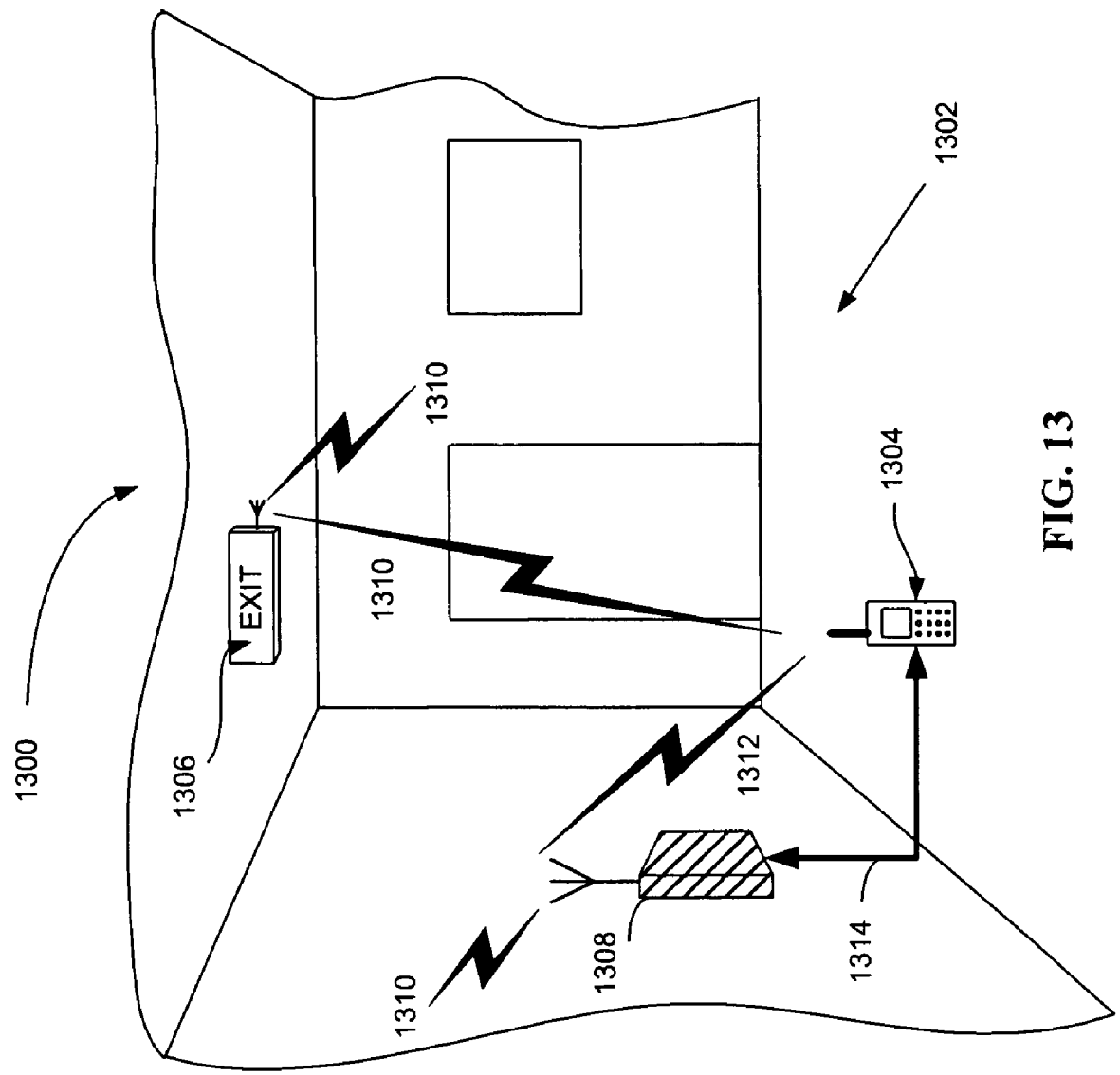
FIG. 13 shows an example of an implementation of the ALCD of FIG. 1 in a room within a building.

FIG. 13 shows an example of an implementation of ALCS 1300 within a room 1302 within a building. The ALCS 1300 may include an ALCD 1304 and a location-module. The location-module may include a wireless and/or wired re-radiator of GPS signals or other location-information signals. As an example, the location-module may include a fixed re-radiator within an "EXIT" sign 1306 or another similar fixed position device 1308 within a room 1302 or hallway within a building. As an example of operation, the ALCD 1304 may either receive wireless aiding signals from location-module (such as signals 1310 and 1312 from the EXIT sign 1306 or fixed position device 1308, respectively) or wired-aiding signals 1314 from the fixed position device 1308. The aiding signals may provide time-reference, ephemeris, or other similar GPS aiding data. The aiding signals may also provide non-GPS type location data such as information relating to the fixed position of the fixed position device 1308. This information may include the address of the building, the floor of the building, the room 1302 number or hallway, and the position of the fixed position device 1308 within the room 1302.

Figure 14:
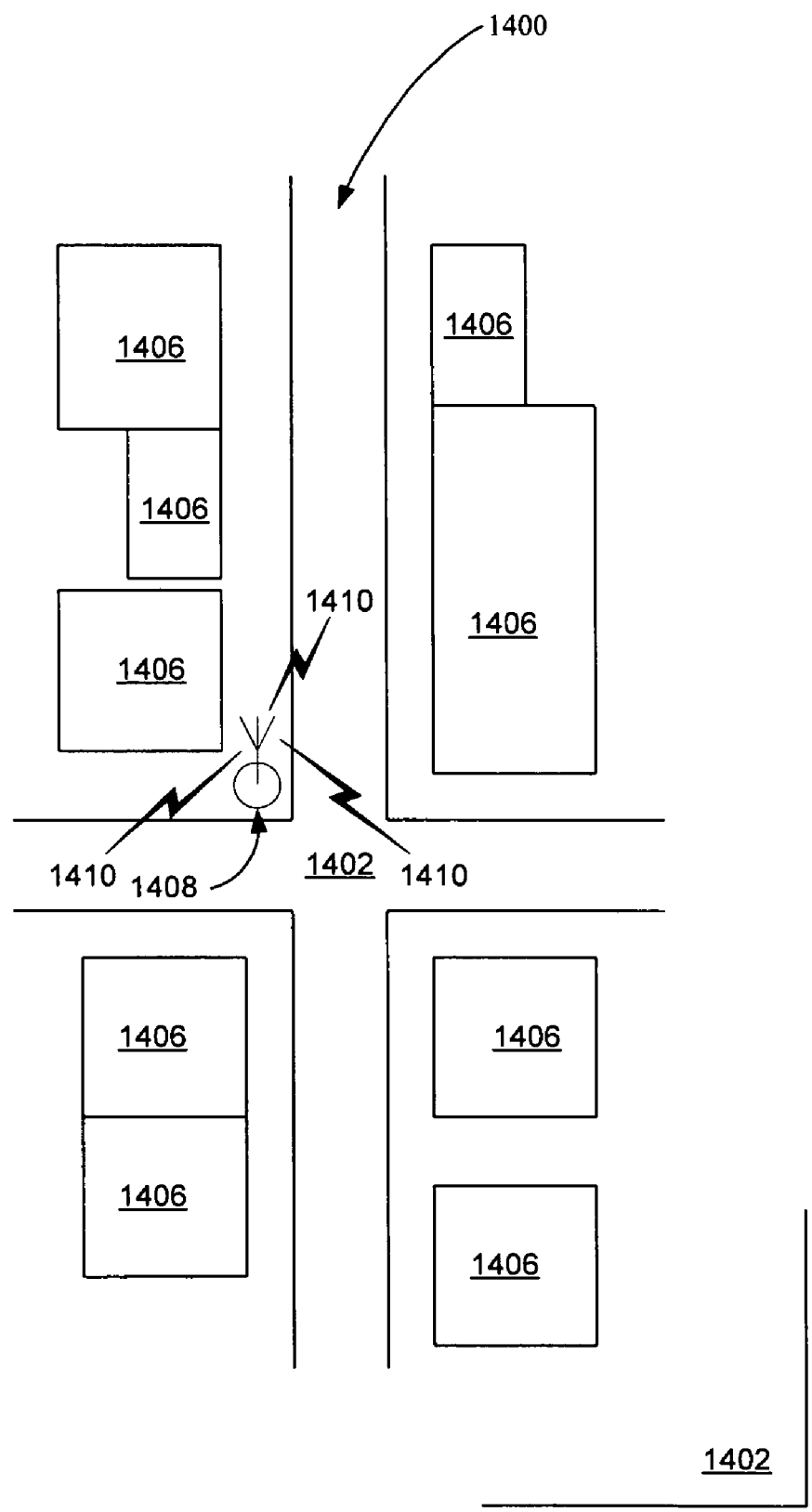
FIG. 14 shows an example of an implementation of the ALCD of FIG. 1 located at an intersection of four city blocks having numerous buildings.

Similarly, FIG. 14 shows an example implementation of a location module within an ALCS 1400 located at an intersection 1402 of four city blocks 1404 having numerous buildings 1406. The location module 1408 may include a wireless and/or wired re-radiator of GPS signals or other location information signals. As an example, the location module 1408 may include a fixed re-radiator 1408 within a light post, street sign, or other similar fixed position devices. As an example of operation, an ALCD (not shown) may either receive wireless aiding signals 1410 from location module 1408. The aiding signals 1410 may provide time-reference, ephemeris, or other similar GPS aiding data. The aiding signals may also provide non-GPS type location data such as information relating to the fixed position of the location module 1408. This information may include the address of the intersection 1402, the corner on the intersection 1402, or other similar information.

Other Modes

The ALCS may, in other modes similar to the GPS-standalone, GPS-autonomous, GPS-network aided, or network-based modes, also may receive information from outside the cellular wireless communications network as well as outside of the GPS satellite system. For example, in other modes, the position-determination section of the ALCD may receive information from the GPS satellites and a Bluetooth network and/or an IEEE 802.11 Wi-Fi network, while utilizing the cellular wireless communication network to transmit voice or data. The GPS acquisition, tracking, and navigation functions may be enhanced with inputs from the Bluetooth network and/or IEEE 802.11 network without utilizing the cellular network.

Furthermore, the example architectures of the ALCS may be extended to wired networks such as the telephone network or data networks without departing from the scope of the present invention. For example, if GPS capabilities are present in a laptop or PDA and the device is connected to a wired or wireless Internet link, the GPS calculations may be aided via the Internet to calculate a position inside a building. The position may be displayed locally or sent to a server. Such an example of an implementation of the ALCD may be utilized for security or other telephone or hardwired system applications.

Comparison of the Operation Modes

The operation modes of the present invention allow further flexibility within the GPS receiver framework. When the GPS receiver is not constrained by short TTFF requirements, or by network bandwidth, or by other signal demands, the GPS receiver of the present invention can be programmed to automatically select a given acquisition mode. For example, when the network traffic is heavy, which translates to a small bandwidth availability in the wireless communications network, the present invention allows the user to automatically or manually select the autonomous mode or standalone mode, which is not dependent on the wireless communications network for aiding information. In the same way, when the geolocation server 108 usage is heavy, and the aiding information latency time is incompatible with the requirements, the user can select, either automatically or manually, the autonomous or standalone mode. However, if additional bandwidth in the wireless network is available, or if the user needs a short TTFF for an E911 call, the present invention allows for manual or automatic override of the autonomous or standalone mode of operation into either autonomous or standalone (if ephemeris is current and there is implicit aiding information), the network-based or network aided modes.

The multimode architecture of the ALCS allows for an automatic seamless and reliable response, by taking advantage of the network assists if and when available, and allows the ALCD to operate independently if the assistance is not available or not available in a timely manner. The network aided operational mode overcomes the start-up limitations of the GPS-autonomous or GPS-standalone modes and allows the same level of performance as the network-based mode, but does not require continuous network connectivity after start-up. If the aiding data (ephemeris, approximate location, approximate time, etc.) has been received by the ALCD over some communication medium, the communication link may be off when the GPS function of ALCD is started. This is the store and forward method of having a thin server directly mounted on the ALCD. The seamless nature and flexibility of the ALCS architecture enables service providers to tune the ALCS to meet their needs based on the capabilities of the network and the type of services desired.

Furthermore, the selection of the operational mode may depend on the type of service or the accuracy that the ALCD has requested or demanded from the ALCS. For example, if the user places an E911 call, the GPS receiver in the ALCD may automatically be placed in the mode that will provide the most accurate position information in the timeliest manner possible. That mode may be network-based, but, if the network is not capable of supplying a complete GPS information set such that the GPS receiver of the ALCD may determine position calculation information, the position-determination section in the ALCD may switch to the network aided mode, such that the processing capabilities of the network and the position-determination section are utilized in parallel. As another example, if a user requests directions to a specific location, the ALCD may automatically select the GPS-autonomous or GPS-standalone mode that will provide information in a timely manner, but not place such demands on the power supply and processing capabilities of the ALCD. Furthermore, the ALCS allows the user to override the automatic choice of operational mode. The ALCD may also switch between modes once a predetermined event (e.g., the first position calculation of the position-determination section) is obtained. For example, if an E911 call is placed, the ALCD may select the network aided mode to obtain the position information to the ALCD as quickly as possible. Once that information is delivered, and the first position is calculated, the ALCD may then switch to a different mode (such as GPS-autonomous mode or GPS-standalone mode) to make additional bandwidth in the wireless communications network available to other users. For privacy purposes, the architecture of the ALCS also allows for reception of aiding information and provides the user the choice accepting that the position be sent to the network, or "locked" in the ALCD, available only to the user, if the user wants to maintain the location of the ALCD secret.

For example, situations where the network access is charged to the user on a per use basis, the architecture of ALCS also allows the user the choice of preventing the network connection for assistance, even when the ALCD has determined it is necessary to reach the network in order to meet the user's requirements. In this example, the position-determination section will attempt to provide a position in GPS-standalone mode potentially without fulfilling the original performance requirements of the user.

The ALCS allows for the bandwidth of the wireless communications network to be managed such that the bandwidth may be utilized more efficiently. Furthermore, the ALCS allows for dynamic allocation of the network resources, including the processing available on the ALCD, to process as much information in parallel as possible. This allows for dynamic loading of the GPS client and network server processors to more efficiently calculate position for multiple ALCDs. This approach allows for an increased number of ALCD users without significantly affecting the infrastructure of the wireless communications system.

Multi-Correlator Architecture

To assist the ALCS, multiple correlators may be utilized to provide the ALCD with a shorter TTFF, a more accurate position, or a more reliable result with fewer transfers from the GPS-autonomous or GPS-standalone mode to the network aided mode or network-based mode.

Distributed Smart Client/Server Architecture

By allowing the GPS receiver in the position-determination section (also known as the client) of the ALCD and the communications section (also known as the server) of the ALCD to distribute the workload of acquisition, tracking, and navigation tasks in an intelligent manner, the ALCS allows for faster acquisition, faster TTFF times, and allows parts of the position-determination section to be powered down or selectively powered to reduce power consumption of the GPS portion of the ALCD.

The architecture of ALCS also allows for advance qualification of ephemeris data (e.g., validation of stored ephemeris data quality) by using the network aided mode to verify that the stored ephemeris data at the GPS receiver in the position-determination section is still valid. Similarly, the network aided mode allows the ALCD to derive coarse location data that may be utilized for a coarse location acquisition scenario, where a time-tag approximate position based on known ephemeris or almanacs and post processing of the data is utilized for actual location determination. Additionally, coarse location data may also be utilized at a remote server with current ephemeris data, as described in U.S. Pat. No. 6,671,620, issued to Garin et al., which is incorporated by reference herein in its entirety.

The other modes (such as the augmented-autonomous mode) also allow for the utilization of low power short range wireless technology, such as Bluetooth, to aid the position-determination section in reducing TTFF times, as well as using low power short range wireless technology to aid the position-determination section with an approximate location.

The ALCD also allows correction information to be sent to the ALCS via the wireless communications network, by switching between the GPS-autonomous or GPS-standalone and network aided modes, or by remaining in the network aided mode, for slow changing errors to obtain precise local position (e.g., Iono correction factors, new sub-almanac information, etc.). The ALCS also allows for data "fusion" from various sources (e.g., accelerometer, pressure sensors, tilt meters, etc.) also included on the ALCD to add to the accuracy of the position determination, as well as providing the ALCD with approximate location, time, and frequency information to assist the ALCD in determination of a more precise position determination and/or improve the TTFF time for each client.

Time and Frequency Aiding

Wireless network systems typically have high quality reference clocks, and some wireless network systems, such as CDMA, are synchronized on absolute GPS-time. The ALCS allows for the wireless network frequency reference to be transferred to the position-determination section of the ALCD to estimate the GPS-clock frequency offset and significantly reduce the frequency uncertainty. The GPS-time reference may be transferred to the position-determination section to the GPS-clock time. The main purpose of time and frequency transfer is to reduce the uncertainties of ALCD clock time and frequency, and thus to improve the TTFF. This time transfer may also contribute to improve the sensitivity.

Time Transfer

Figure 15:
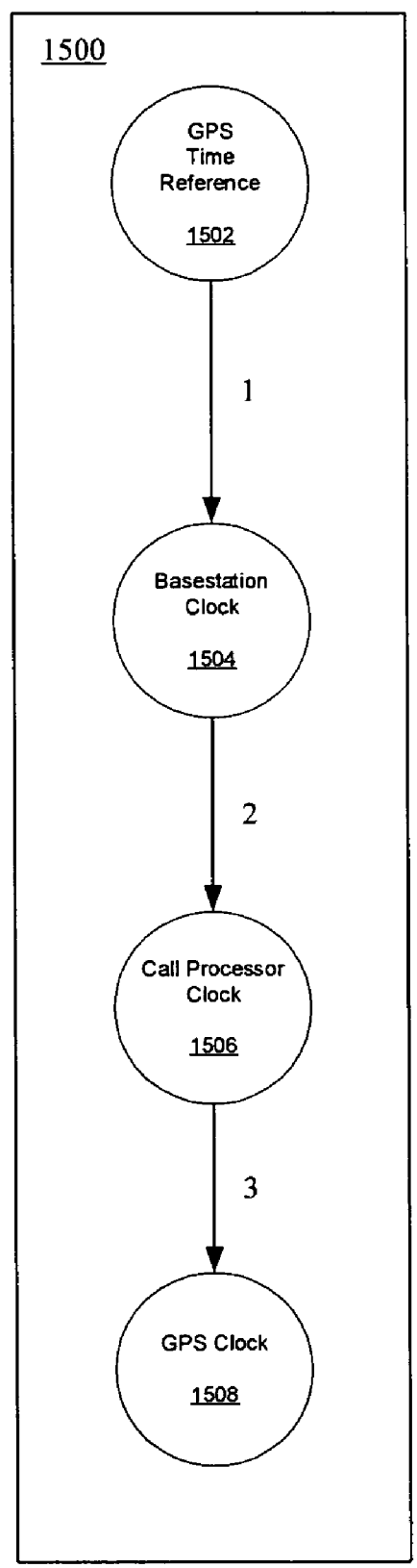
FIG. 15 illustrates an example of an implementation of a time-transfer architecture as utilized in conjunction with the ALCS of FIG. 1.

FIG. 15 illustrates a block diagram of an example implementation of a time transfer mechanism utilized in conjunction with ALCS 1500. In this example, the ALCS 1500 is synchronized on absolute GPS time, such as wireless network utilizing CDMA or GSM with Location Measurement Units ("LMU"). Typically, the GPS-time reference 1502 is transferred to the GPS section of the ALCD (not shown) to synchronize GPS-clock time with GPS-time. In this example in the ALCS, the time transfer may be accomplished in three steps.

In the first step, the basestation ("BS") clock 1504 may be synchronized to the GPS-time reference 1502. The time accuracy at the BS-clock 1504 depends on the system configuration and may be in the range of 100 to 300 nanoseconds. This is typically a built-in feature of certain types of networks.

In the second step, the CP-clock 1506 is synchronized onto the BS-clock 1504 by timing the reception of one specific event in the master frame transmitted from the BS-clock 1504 to the CP-clock 1506. The BS-clock 1504 transmits the master frame with the transmission time of the first bit predictable in absolute GPS-time with an accuracy of 300 nanoseconds. The synchronization error between the BS-clock 1504 and the CP-clock 1506 is caused by the RF reference point in the BS-clock 1504 signal, group delay in the BS-clock 1504, signal transmission time due to the distance between the ALCD and the basestation, the group delay in the CP section, and the ALCD architecture.

As long as the ALCD tracks the basestation, the CP section of the ALCD knows the absolute GPS-time and may predict the associated accuracy of the GPS-time at the ALCD, measured and adjusted during the product integration phase, not in real time. If the ALCD loses track of the basestation or the BS-clock 1504, the CP-clock 1506 accuracy will degrade. The CP-clock 1506 performance degradation may be predicted based on the CP-clock 1506 frequency stability, which is normally represented by the Allan variance, and the age of the last tracking.

The ALCS is designed to be air-interface independent. As the mobile handset (i.e., the ALCD) manufacturer has the knowledge of tracking conditions, the CP-clock 1504 frequency stability, and the air-interface performance, the mobile handset manufacturer may determine the preferred or best method to provide models and/or interfaces to the GPS-clock 1508 to transfer the absolute GPS-time and the associated accuracy including all uncertainty effects.

In the third step, the GPS-clock 1508 asks the CP-clock 1506 for a time transfer message via the communications link between the position-determination section of the ALCD and the communication section of ALCD. Typically, this time transfer request message contains no parameter.

The communication section of the ALCD may react to such a message in several different ways. The communication section may generate a precise timing event and return a time transfer response message. The timing event is typically a single rectangular pulse, with either a rising edge active or falling edge active. The time transfer response message typically contains the time of the timing event in GPS week, seconds into the week, and time uncertainty in seconds. By timing the timing event using the GPS-clock 1508, the GPS-clock 1508 is synchronized onto CP-clock 1506 time.

The communication section may also send a "delta" message back to the position-determination section. For example, the communication section or position-determination section may monitor the CP-clock 1506 and GPS-clock 1508. When a time transfer request is made, the communication section, or the position-determination section, whichever section is monitoring the clocks, receives a GPS-time 1502, a difference calculation is made between the GPS-clock 1508 and the GPS-time 1502. This delta may then be utilized for GPS calculations and position determinations until a new time transfer is requested.

The timing information is typically required when the position-determination section begins a new search on a new GPS satellite. The timing synchronization may be made periodically at the request of the position-determination section. The effective time accuracy available for the search may be degraded over time since the last reference time and/or frequency was sent due to the quality of the GPS-clock 1508; however, the approach described with respect to the ALCS reduces or eliminates the need for locking the GPS-clock 1508 to the CP-clock 1506, as well as having the CP-clock 1506 locked to the GPS-time reference 1502 via the BS-clock 1504. The frequency stability of the GPS-clock 1508 (represented by its Allan variance as well as the frequency stability over temperature) may be utilized to predict the time uncertainty at the beginning of the GPS satellite signal search. The ALCS aides the ALCD in correctly predicting the time degradation effects, to choose the time transfer periodicity, and to implement the time transfer since the control of the GPS-clock 1508 choice and when the next search is made is under the control of the ALCS.

Frequency Transfer

Figure 16:
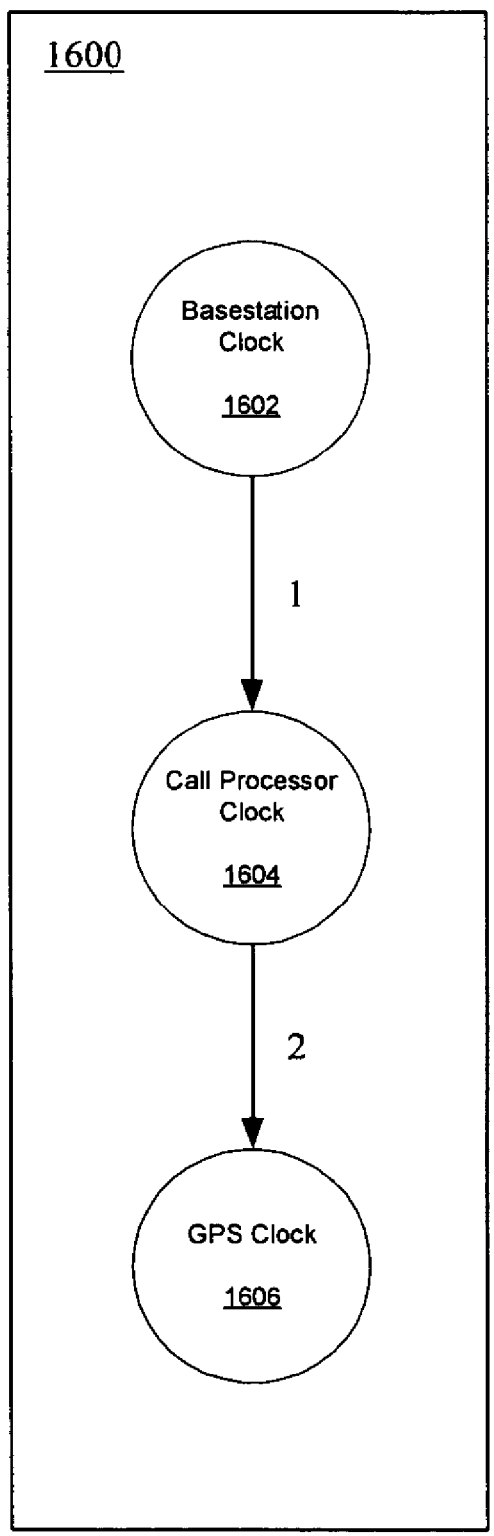
FIG. 16 illustrates an example of an implementation of frequency-transfer architecture as utilized in conjunction with the ALCS of FIG. 1.

FIG. 16 illustrates an example of an implementation of frequency-transfer architecture as utilized in conjunction with the ALCS 1600. In this example, the ALCS 1600 operates in conjunction with cellular telephone system such as the CDMA system utilized in the United States where each basestation ("BS") has a high quality reference clock. System ALCS 1600 shows that the BS-clock 1602, with an associated BS-clock 1602 frequency, may be transferred to the CP-clock 1604 and then to the GPS-clock 1606 as follows, to estimate the GPS-clock 1606 frequency offset as necessary.

Typically, the communication section of the ALCD (not shown) tracks the wireless network signals and measures the CP-clock 1604 frequency offset relative to the BS-clock 1602. The CP-clock 1604 frequency uncertainty after this measurement is typically caused by BS-clock 1602 frequency offset, which is specified by the network standards, ALCD tracking loop performance, CP-clock 1604 frequency stability, and ALCD motion.

The communication section then periodically transmits a frequency reference message to the position-determination section where the message typically contains the error in frequency between the CP-clock 1604 and the BS-clock 1602. The frequency reference message is sent at a period determined by the ALCD capabilities, as well as the necessity of the updates based on the GPS-clock 1506 and/or CP clock 1604 requirements. For example, if the GPS-clock 1606 and CP clock 1604 are both high quality crystals, the update message may be sent less often than if the GPS-clock 1606 and the CP clock 1604 are both low quality crystals, or in some cases only once. However, the periodicity of the frequency error update is selectable by the ALCD manufacturer. Because the GPS clock 1506 is compared to the CP-clock 1604 at its own rate as described below, any CP-clock 1604 versus BS-clock 1602 drift between frequency reference messages will be added to the uncertainty of the GPS-clock 1606. Another method for setting the CP-clock 1604 is to steer the CP-clock 1604 onto the received signals and synchronized onto BS-clock 1602.

Other approaches, such as U.S. Pat. No. 5,841,396, issued to Krasner, which is incorporated by reference herein, describe a phase-locked loop approach to locking the GPS-clock 1606 to the CP-clock 1604. The ALCS 1600 avoids the additional circuitry and signal transfer between the CP section and the GPS section that is described by the Krasner approach. This results in the ALCS 1600 being easier and less expensive to implement in an existing cellular, wireless, or wired telephone system.

Figure 17:
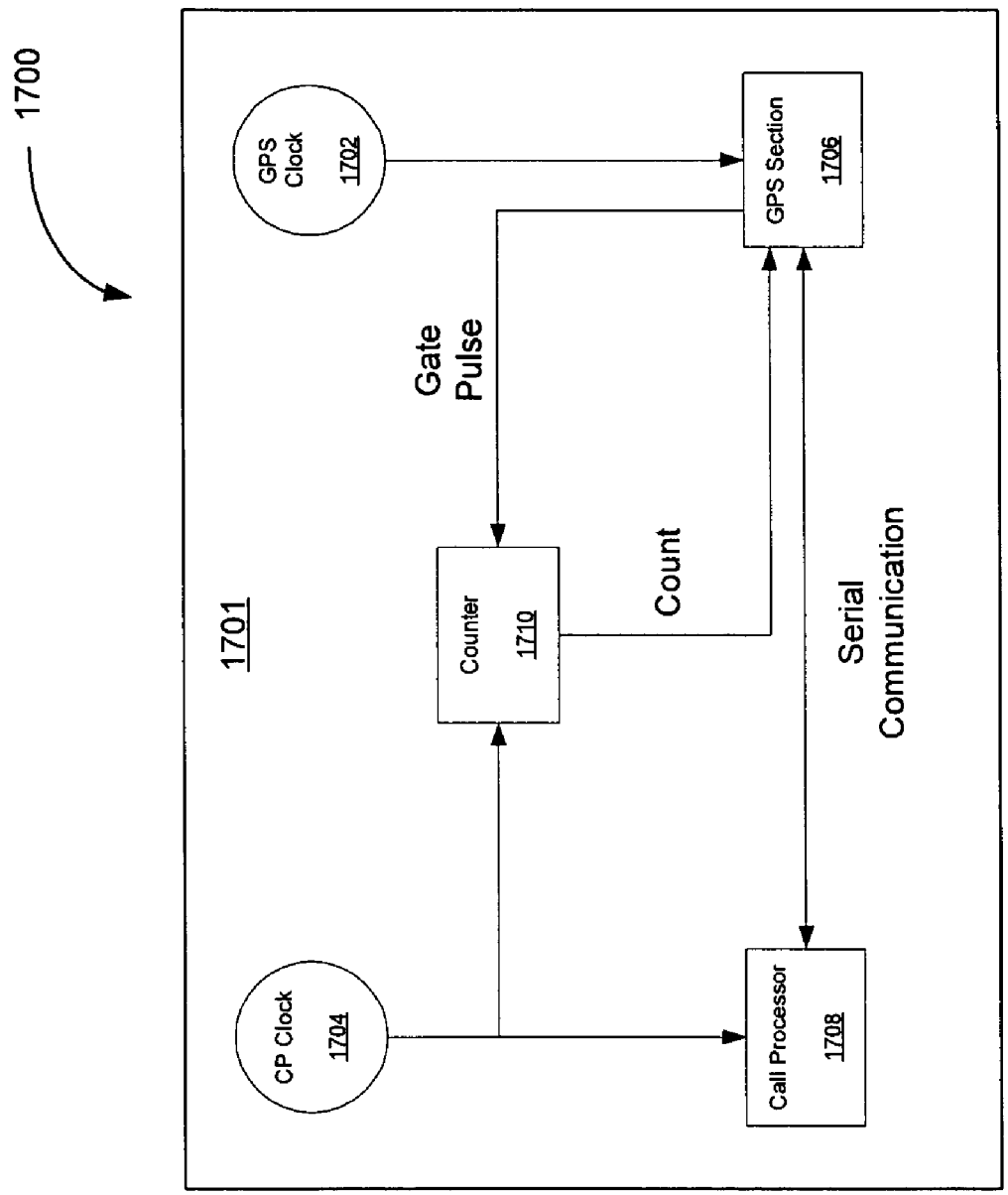
FIG. 17 illustrates a block diagram of an example of an implementation of the frequency-transfer architecture utilized in conjunction with the ALCS of FIG. 1.

FIG. 17 illustrates a block diagram of an example of an implementation of the frequency-transfer architecture utilized in conjunction with the ALCS 1700. The ALCD 1701 may maintain the overall frequency error within limits imposed by the total frequency error budget without locking the GPS-clock 1702 to the CP-clock 1704. The ALCD 1701 may include a GPS section 1706 within the position-determination section (not shown) and CP section 1708 within the communication section (not shown) along with the GPS-clock 1702 and CP-clock 1704. ALCD 1701 manufacturers may design specific bounds of the message periodicity depending on the residual budgeted frequency error after adjusting the frequency and/or time using the reference message, and Allan variance characteristics of the CP-clock 1704. The transmitted information is the relative frequency error, not the absolute error (in Hertz "Hz"), because the GPS section 1706 does not know the absolute frequency of the CP-clock 1704. The message that the GPS section 1706 needs is independent from the nominal CP-clock 1704 frequency.

The GPS section 1706, and the GPS-clock 1702, utilize the uncertainty information of the CP-clock 1704 frequency to optimize signal acquisition performance. Everything in the error budget, other than the ALCD 1701 motion, depends on the wireless infrastructure and the CP section 1708 architecture. The CP section 1708 sends the GPS section 1706 messages periodically, which messages contain CP-clock 1704 nominal frequency in Hertz (e.g., the frequency of the divided CP-clock 1704 is sent to the counter 1710 by the CP section 1708 for measurement to convert absolute frequency error into a relative frequency error) CP-clock 1704 relative frequency offset versus BS clock (not shown) frequency, and CP-clock 1704 frequency offset uncertainty.

The GPS section 1706 then measures the relative frequency between the GPS-clock 1702 and the CP-clock 1704 utilizing a counter 1710. The effective width of the counter gating signal is determined by counting a predetermined number of GPS-clock 1702 pulses. The number of CP-clock 1704 pulses during this gating signal is utilized to determine the relative frequency error between the GPS-clock 1702 and the CP-clock 1704.

The frequency drift between transmissions of the frequency reference information depends on the Allan variance of the GPS-clock 1702 and its stability over temperature. The periodicity of sending of the frequency reference information may be adjusted depending on maximum frequency error allocated to the GPS-clock 1702, and quality of the GPS-clock 1702. In an alternate implementation, or for convenience of implementation, a frequency divider may be inserted between CP-clock 1704 and counter 1710, thus reducing the absolute frequency to be measured by the counter 1710. This process is described in U.S. Pat. No. 6,684,158, issued on Jan. 27, 2004 to Garin et al. and titled "Method for aiding a global positioning system," which is herein incorporated by reference in its entirety.

Figure 18:
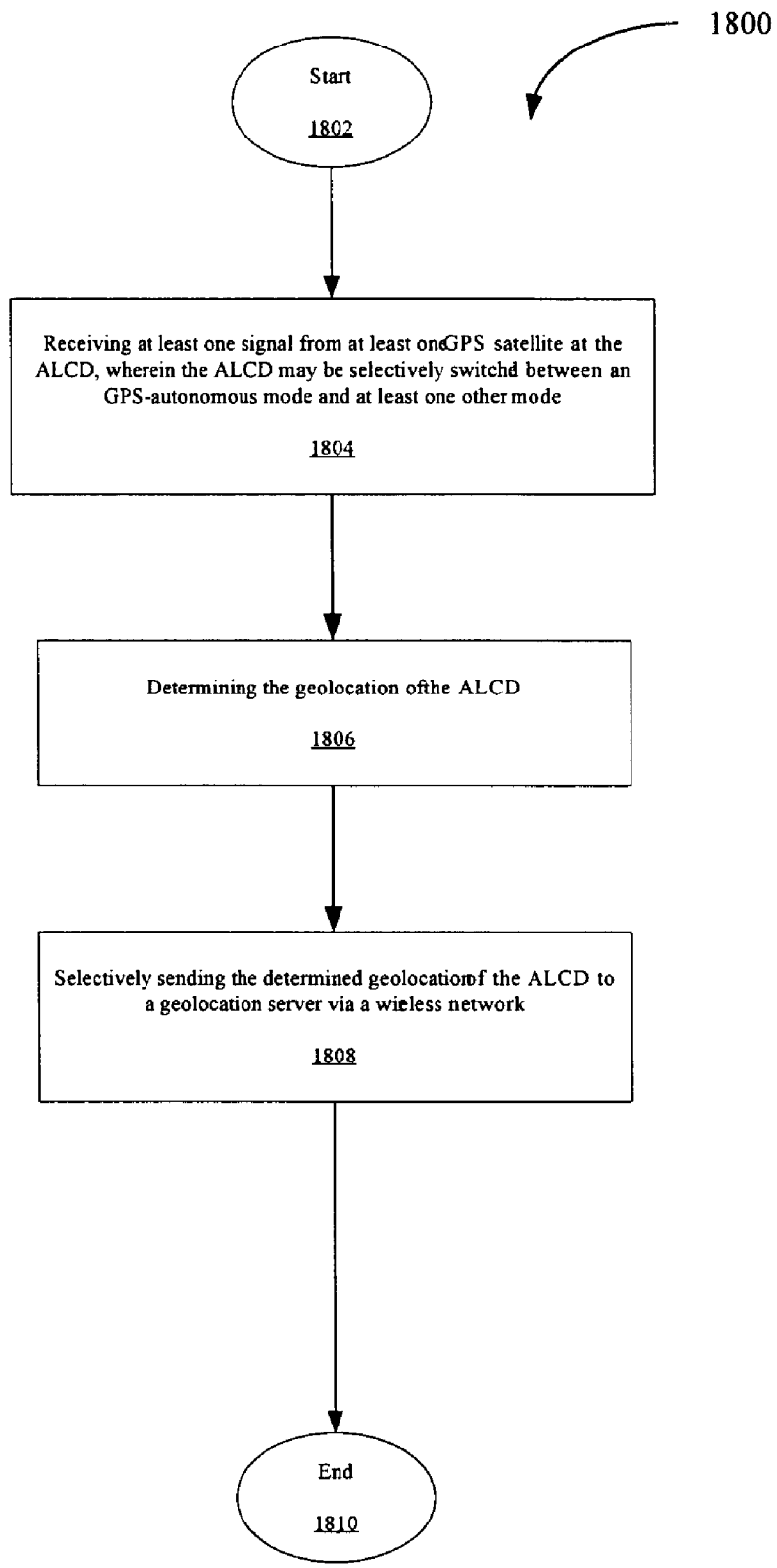
FIG. 18 is a flowchart illustrating an example of the process performed by the ALCS of FIG. 1.

In FIG. 18, a flowchart 1800 is shown illustrating the steps utilized to practice an example process performed by the ALCS. The process begins 1802, and block 1804 illustrates receiving at least one signal from at least one GPS satellite at the ALCD, wherein the ALCD may be selectively switched between a GPS-standalone mode and at least one other mode. Block 1806 illustrates periodically transmitting a frequency reference message to the ALCD. Block 1808 illustrates determining the geolocation of the ALCD utilizing the at least one signal and the frequency reference message. The process then ends in step 1810.

The process in FIG. 18 may be performed by hardware or software. If the process is performed by software, the software may reside in software memory (not shown) in the ALCS. The software in software memory may include an ordered listing of executable instructions for implementing logical functions (i.e., "logic" that may be implement either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

GPS-Engine Tracker Architecture

It is appreciated by those skilled in the art that while a GPS receiver has been described in this application, the position-determination section may also be implemented utilizing GPS tracker device (i.e., "GPS tracker" or "GPS baseband tracker") having a GPS-Engine that may only measure GPS data and then send the measured data to a host processor located external to the GPS tracker. In this example, the host processor may be the communication section described in FIGS. 2, 4, and 5. A GPS-Engine is a device having GPS tracker hardware. Generally, the GPS-Engine hardware acquires and tracks GPS satellites and sends raw measurement data (such as measured psuedorange data from the GPS satellites) to a host processor for position calculation. As an example, a GPS-Engine may be implemented with components available from SiRF Technology, Inc. of San Jose Calif. For example, an RF interface circuit may be implemented as a GRF2i/LP integrated circuit. Then a location processing circuit may be implemented, for example, as a GSP2t integrated circuit or GSP2e integrated circuit. This type of GPS-Engine hardware would minimizes the overhead on a host processor and operating system by keeping low the maximum transmission rate of raw measurements to the host processor (e.g., one measurement per second) because the GPS-Engine acquires and tracks the GPS satellites, then sends raw measurements to the host processor running navigation software (such as for example SiRFNav or similar type of software) in parallel with different host applications. The navigation software would then compute position, time, and velocity of the GPS-Engine device. Examples implementing a GPS-Engine with navigation software is described in U.S. patent application Ser. No. 10/199,253, filed Jul. 18, 2002, titled "Tracker Architecture for GPS System," U.S. patent application Ser. No. 11/149,438, filed Jun. 6, 2005, titled "Host Based Satellite Positioning Systems," which is a continuation of U.S. patent application Ser. No. 10/269,914, filed Oct. 10, 2002, titled "Host Based Satellite Positioning Systems," U.S. patent application Ser. No. 10/269,105, filed Oct. 10, 2002, titled "Layered Host Based Satellite Positioning Solutions," and U.S. patent application Ser. No. 10/269,104, filed Oct. 10, 2002, titled "Navigation Processing in Host Based Satellite Positioning Solution," all of which are incorporated into this application by reference in their entirety.

As another example, the GPS-Engine may be implemented with components available from Trimble of Sunnyvale, Calif. As an example, the GPS-Engine may be implemented with Trimble's FirstGPS™ architecture which includes two integrated circuits and FirstGPS™ software. These Trimble integrated circuits provide a GPS "measurement platform" that performs the processor-intensive GPS tracking and processing tasks and enables a host CPU to calculate the actual position, velocity, and time ("PVT") solutions at its own pace, without burdening other applications running on the device.

Similarly, the GPS-Engine may also be implemented with components available from Global Locate of San Jose, Calif. As an example, the GPS-Engine may be implemented with the GL-2000 GPS Baseband Processor integrated circuit and GL-LN22 GPS integrated Front-end integrated circuit, both from Global Locate. In this example, the GL-LN22 GPS Integrated Front-end includes RF signal processing circuitry to amplify and down-convert received GPS signals and digitize them into baseband signals to be processed by the GL-2000 GPS Baseband Processor. The GLS-2000 contains functionality to handle GPS signal processing. It acquires and processes available GPS satellite signals and the GPS signal processor on the GL-2000 performs frequency and code domain searches, measurements satellite range and range rate information, and decodes navigation date messages. Measurement results are then sent to the host processor (such as a host processor on a cellular telephone).

Still further, the GPS-Engine may also be implemented with components available from QUALCOMM, Inc of San Diego, Calif. As an example, the GPS-Engine may be implemented with MGP6200™ multimode GPS processor integrated circuit produced by QUALCOMM and the GPS-Engine may also include an RF front-end circuit such as a RGR6200™ GPS radio receiver also from QUALCOMM. In this example, the RGR6200™ GPS radio receiver includes RF signal processing circuitry to amplify and down-convert received GPS signals and digitize them into baseband signals to be processed by the MGP6200™ multimode GPS processor. The RGR6200™ GPS radio receiver includes functionality to handle GPS signal processing. It acquires and processes available GPS satellite signals and the GPS signal processor on the RGR6200™ GPS performs frequency and code domain searches, measurements satellite range and range rate information, and decodes navigation date messages. Measurement results are then sent to the host processor (such as a host processor on a cellular telephone) such as for example, a MSM6200™ mobile station modem baseband integrated circuit (i.e., "chipset") also from QUALCOMM.

It is also appreciated that as another example of an implementation, the signal chipset may be integrated having the separate functionality of the of GPS-Engine and baseband chipset integrated into one package having separate functional "IP" sections. It is appreciated that IP sections (also known as "intellectual property cores" or "IP cores") includes the design codes of an integrated circuit (i.e., the chipset) and any code for any software embedded into the chipset, both of which allow a manufacturer to integrate the IP core into their products at a lower cost than purchasing an integrating separate chipsets. As an example, the signal integrated chipset may be an MSM™ family chipset, from QUALCOMM utilizing gpsOne® technology.

Figure 19:
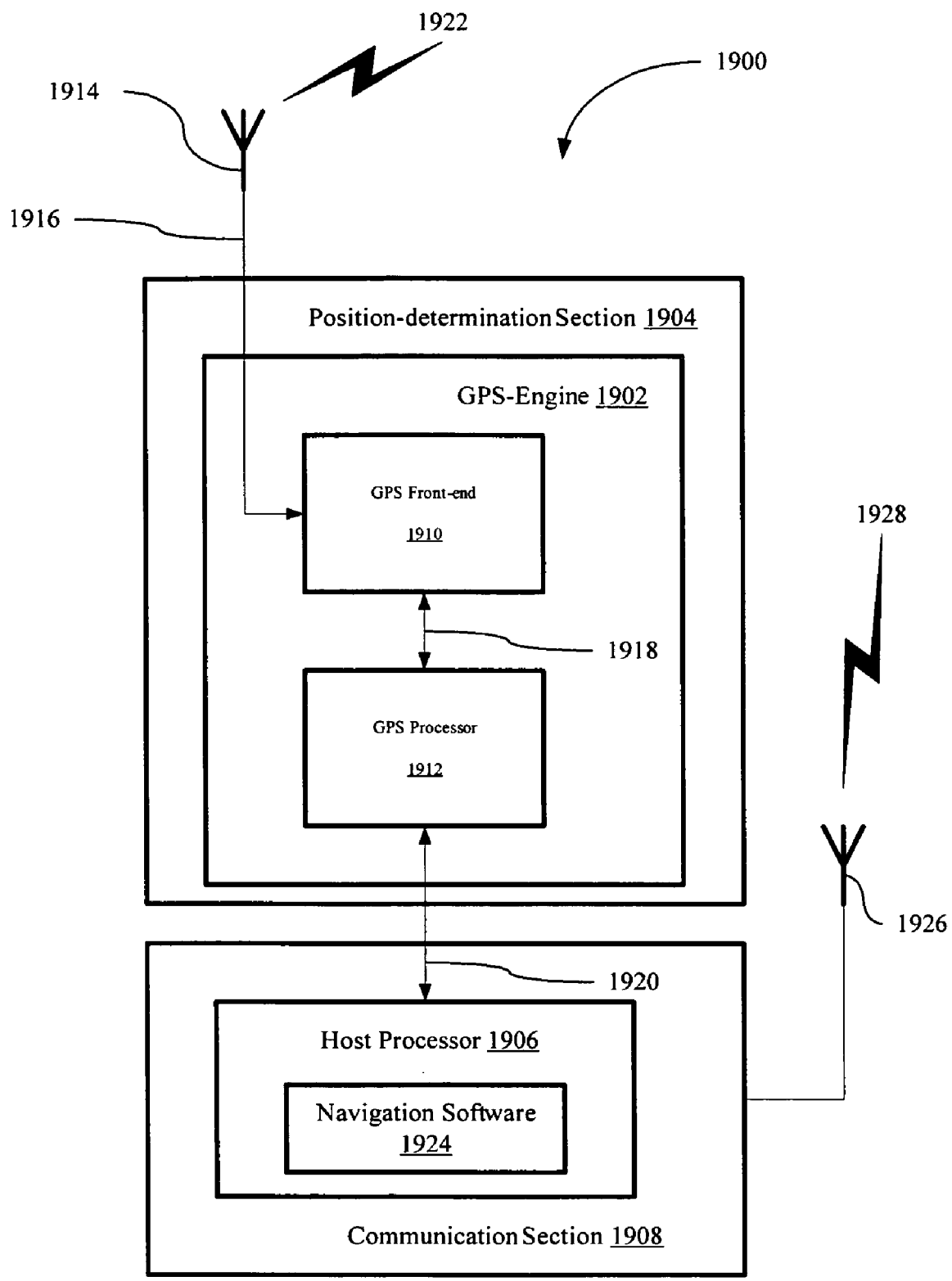
FIG. 19 illustrates a block diagram of an example of an implementation of the ALCD of FIG. 1 utilizing an GPS-Engine.

In FIG. 19, a block diagram an example of implementation of the ALCD 1900 utilizing a GPS-Engine 1902 in the position-determination section 1904 and a host processor 1906 in the communication section 1908. The GPS-Engine 1902 may include a GPS front-end 1910 and GPS processor 1912. The GPS front-end 1910 may be in signal communication with an antenna 1914 via signal path 1916. Additionally, the GPS processor 1912 may be in signal communication with both the GPS Front-end 1910 and Host Processor 1906 via signal paths 1918 and 1920, respectively.

In an example of operation, the GPS-Engine 1902 may receive GPS signals 1922 from a plurality of GPS satellites (not shown) at the GPS Front-end 1910 from the antenna 1914. The GPS Front-end 1910 amplifies and down-converts the received GPS signals 1922 and digitizes them into baseband signals that are passed to the GPS processor 1912. The GPS processor 1912 then acquires and tracks the GPS satellites from the received GPS signals 1922, then sends the raw psuedorange measurements to the Host Processor 1906 running navigation software 1924. The Host Processor 1924 then determines the position of the ALCD 1900 based on the raw psuedorange measurement data provided by the GPS-Engine 1902.

The communication section 1908 is also capable of receiving, via antenna 1926, location aiding signals 1928 as described above for assisting the ACLD 1900 in determining its location. In this example of an implementation, Host processor 1906 may determine the mode of operation of the ACLD 1900 as described above. Based on whether the GPS-Engine 1902 is capable of detecting and receiving GPS signals 1922, the Host Processor 1906 may determine the mode of operation of the position-determination section 1904. The modes may be the GPS-standalone, GPS-autonomous, GPS-network aided, GPS-network centric, network-based, reverse-aiding mode, and augmented-autonomous mode.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. An Aided Location Communication System ("ALCS"), comprising:
    a geolocation server; and
    an Aided Location Communication Device ("ALCD") including:
    a communication section having a host processor in signal communication with the geolocation server,
    a position-determination section having a GPS-engine, which acquires and tracks a GPS signal from a GPS satellite, and is in communication with the host processor,
    wherein the host processor is capable of selectively switching from:
        a first position-determination mode for determining a geolocation of the ALCD, to
        a second position-determination mode for determining the geolocation of the ALCD in response to the host processor determining that the geolocation has been determined in the first position determination mode.

2. The ALCS of claim 1, wherein the selective switching occurs substantially simultaneously with the determination of the geolocation of the ALCD.

3. The ALCS of claim 1, wherein the geolocation server receives at least one GPS-signal from at least one GPS satellite.

4. The ALCS of claim 1, wherein the communication section is capable of selectively sending the determined geolocation of the ALCD to the geolocation server.

5. The ALCS of claim 1, wherein the GPS-engine is a GPS tracker capable of receiving GPS signals and producing GPS pseudo-range signals corresponding to the received GPS signals.

6. The ALCS of claim 1, wherein the first mode position-determination mode is selected from a group consisting of:
    GPS-standalone mode;
    a GPS-autonomous mode;
    a GPS-network aided mode;
    a GPS-network centric mode;
    a network-based mode;
    a reverse-aiding mode; and
    an augmented-autonomous mode.

7. The ALCS of claim 6, wherein the second position-determination mode is selected from a group consisting of:
    the GPS-standalone mode;
    the GPS-autonomous mode;
    the GPS-network aided mode;
    the GPS-network centric mode;
    the network-based mode;
    the reverse-aiding mode; and
    the augmented-autonomous mode.

8. The ALCS of claim 7, wherein the GPS-engine is a GPS tracker capable of receiving GPS signals and producing GPS pseudo-range signals corresponding to the received GPS signals.

9. The ALCS of claim 7, wherein the communication section is capable of selectively sending the determined geolocation of the ALCD to the geolocation server.

10. The ALCS of claim 9, wherein the communication section includes a wireless receiver.

11. The ALCS of claim 10, wherein the selective switching of the position determination section is performed automatically by the ALCD.

12. The ALCS of claim 11, wherein the selective switching of the position determination section is performed automatically by the communication section.

13. The ALCS of claim 6 or 7, wherein the augmented-autonomous mode utilizes a network resource selected from a group consisting of:
    a computer network;
    a communication network; and
    a wireless network.

14. The ALCS of claim 13, wherein the GPS-engine is a GPS tracker capable of receiving GPS signals and producing GPS pseudo-range signals corresponding to the received GPS signals.

15. The ALCS of claim 14, wherein the wireless network is a Bluetooth wireless network.

16. The ALCS of claim 14, wherein the wireless network is an IEEE 802.11 wireless network.

17. The ALCS of claim 6 or 7, wherein the augmented-autonomous mode utilizes an external device that is capable of transmitting augmented-aiding information.

18. The ALCS of claim 17, wherein the GPS-engine is a GPS tracker capable of receiving GPS signals and producing GPS pseudo-range signals corresponding to the received GPS signals.

19. The ALCS of claim 18, wherein the external device utilizes a wireless transmission to transmit the augmented-aiding information.

20. The ALCS of claim 19, wherein the wireless transmission includes a Bluetooth transmission.

21. The ALCS of claim 19, wherein the wireless transmission includes an IEEE 802.11 transmission.

22. The ALCS of claim 19, wherein the external device includes a GPS wireless re-radiator.

23. The ALCS of claim 18, wherein the external device utilizes a non wireless transmission to transmit the augmented-aiding information.

24. The ALCS of claim 23, wherein the non-wireless transmission includes a serial connection.

25. The ALCS of claim 23, wherein the non-wireless transmission includes an Ethernet connection.

26. The ALCS of claim 23, wherein the non-wireless transmission includes an electrical connection.

27. The ALCS of claim 18, wherein the augmented-aiding information includes the location information for the external device.

28. The ALCS of claim 18, wherein the augmented-aiding information includes ephemeris data for the GPS satellites.

29. The ALCS of claim 7, wherein the ALCD operating in the network-based mode utilizes transmitters within an external communication system to determine the geolocation of the ALCD.

30. The ALCS of claim 29, wherein the ALCD utilizes a Time Difference of Arrival ("TDOA") technique to determine the geolocation of the ALCD.

31. The ALCS of claim 30, wherein the GPS-engine is a GPS tracker capable of receiving GPS signals and producing GPS pseudo-range signals corresponding to the received GPS signals.

32. The ALCS of claim 7, wherein the ALCD operating in the reverse-aiding mode monitors the ALCS.

33. The ALCS of claim 32, wherein the GPS-engine is a GPS tracker capable of receiving GPS signals and producing GPS pseudo-range signals corresponding to the received GPS signals.

34. The ALCS of claim 33, wherein the ALCD operating in the reverse-aiding mode monitors the ALCS for utilization in power management of the ALCS.

35. The ALCS of claim 34, where the power management includes varying the characteristics of an antenna beam transmitted from a basestation to the ALCD, wherein the basestation is within the ALCS.

36. The ALCS of claim 33, wherein the ALCD operating in the reverse-aiding mode monitors the ALCS for utilization in cell planning of the ALCS.

37. The ALCS of claim 33, wherein the ALCD sends the geolocation server the determined geolocation of the ALCD along with wireless network monitoring information.

38. The ALCS of claim 37, wherein the wireless network monitoring information includes wireless signal strength of the wireless network at the geolocation of the ALCD.

39. The ALCS of claim 33, wherein the ALCD sends the geolocation server the geolocation, velocity and heading of the ALCD within the wireless network.

40. The ALCS of claim 33, wherein the ALCD, operating in the reverse-aiding mode, provides the geolocation server with redundant time and frequency reference information measured at the ALCD.

41. The ALCS of claim 40, wherein the ALCS models the wireless network time offset and frequency drift from the redundant time and frequency reference information measured at the ALCD.

42. The ALCS of claim 33, wherein the ALCD sends the geolocation server the multipath information measured at the ALCD.

43. The ALCS of claim 42, wherein the ALCS models the wireless network multipath characteristics from the measured multipath information from the ALCD.

44. The ALCS of claim 33, wherein the ALCS aligns the phase locked loop ("PLL") of the ALCD wireless tracking loops.

45. The ALCS of claim 7, wherein the GPS-engine is a GPS tracker capable of receiving GPS signals and producing GPS pseudo-range signals corresponding to the received GPS signals.

46. The ALCS of claim 45, wherein the ALCD operating in the reverse-aiding mode utilizes direct GPS aiding from a second ALCD within the ALCS without utilizing the geolocation server.

47. The ALCS of claim 45, wherein the ALCD operating in the reverse aiding mode utilizes space-domain multiplexing ("SDM") to increase the frequency capacity within a cell of the ALCS.

48. The ALCS of claim 45, wherein the position-determination section switches between the first position-determination mode and the second position determination mode when a predetermined event occurs.

49. The ALCS of claim 48, wherein the predetermined event is initial acquisition of at least one GPS satellite signal.

50. The ALCS of claim 49, wherein the first position-determination mode is the GPS-standalone mode and the second position-determination mode is selected from a group consisting of:
    the GPS-autonomous mode;
    the GPS-network aided mode;
    the GPS-network centric mode;

the network-based mode;
the reverse-aiding mode; and
the augmented-autonomous mode.

51. The ALCS of claim 50, wherein the selective switching of the position-determination section switches the position-determination section from the second position-determination mode to the GPS-standalone mode.

52. The ALCS of claim 50, wherein the second position-determination mode is the GPS-network aided mode.

53. The ALCS of claim 50, wherein the second position-determination mode is the reverse-aiding mode.

54. The ALCS of claim 53, wherein the ALCD is capable of receiving information from a second source.

55. The ALCS of claim 54, wherein the second source is selected from a group consisting of:
a Bluetooth network;
a specialized mobile radio ("SMR") network;
a personal communication system ("PCS") network;
a non-wireless local area network;
a wireless local area network; an infrared network;
a paging network;
a two-way paging network; and an FM broadcast network.

56. The ALCS of claim 55, wherein the wireless local area network is an IEEE 802.11 wireless network.

57. The ALCS of claim 55, wherein the geolocation of the ALCD is determined utilizing GPS-signals from at least one GPS satellite and the information from the second source.

58. The ALCS of claim 48, wherein the predetermined event is a lapse of a predetermined amount of time without acquiring at least one GPS satellite signal.

59. The ALCS of claim 58, wherein the predetermined event occurs within a thirty second time window centered on a time of determination of the geolocation of the ALCD.

60. The ALCS of claim 45, wherein
the communication section is capable of selectively sending the determined geolocation of the ALCD to the geolocation server,
the communication section includes a wireless receiver, and
the communication section periodically transmits a frequency reference message to the position-determination section.

61. The ALCS of claim 60, wherein the frequency reference message steers a call processing clock onto a basestation clock, where the call processing clock is part of the communication section and the basestation clock is in signal communication with the geolocation server.

62. The ALCS of claim 60, wherein the frequency reference message includes an error between a call processing clock and a basestation clock, where the call processing clock is part of the communication section and the basestation clock is in signal communication with the geolocation server.

63. The ALCS of claim 62, wherein a GPS clock in the position-determination section is periodically compared to the call processing clock to determine a frequency offset of the GPS clock.

64. The ALCS of claim 63, wherein the periodic transmission of the frequency reference message and the periodic comparison of the GPS clock to the call processing clock have the same period.

65. The ALCS of claim 64, wherein the position-determination section switches between the first position-determination mode and the second position determination mode when a predetermined event occurs.

66. The ALCS of claim 65, wherein the predetermined event is initial acquisition of at least one GPS satellite signal.

67. The ALCS of claim 66, wherein the selective switching of the position-determination section switches the position-determination section from the first position-determination mode to the GPS-standalone mode.

68. An Aided Location Communication Device ("ALCD"), the ALCD comprising:
a communication section having a host processor for communicating with a wireless communications network; and
a position-determination section having a GPS-engine, which acquires and tracks a GPS signal from a GPS satellite, and communicates with the host processor,
wherein the host processor is capable of selectively switching from:
a first mode position-determination mode for determining a geolocation of the ALCD, to
at least one other position-determination mode for determining the geolocation of the ALCD in response to the host processor determining that the geolocation has been determined in the first position determination mode.

69. The ALCS of claim 68, wherein the GPS-engine is a GPS tracker capable of receiving GPS signals and producing GPS pseudo-range signals corresponding to the received GPS signals.

70. The ALCD of claim 69, wherein the first mode position-determination mode is selected from a group consisting of:
GPS-standalone mode;
a GPS-autonomous mode;
a GPS-network aided mode;
a GPS-network centric mode;
a network-based mode;
a reverse-aiding mode; and
an augmented-autonomous mode.

71. The ALCD of claim 70, wherein the at least one other position-determination mode is selected from a group consisting of:
the GPS-standalone mode;
the GPS-autonomous mode;
the GPS-network aided mode;
the GPS-network centric mode;
the network-based mode;
the reverse-aiding mode; and
the augmented-autonomous mode.

72. The ALCD of claim 71, wherein the selective switching occurs substantially simultaneously with the determination of a geolocation of the ALCD.

73. The ALCD of claim 71, wherein the communication section is capable of selectively sending a determined geolocation of the ALCD to a geolocation server.

74. The ALCD of claim 73, wherein the communication section includes a wireless receiver.

75. The ALCD of claim 70 or 71, wherein the augmented-autonomous mode utilizes a network resource selected from a group consisting of:
a computer network;
a communication network; and
a wireless network.

76. The ALCD of claim 75, wherein the wireless network is a Bluetooth wireless network.

77. The ALCD of claim 76, wherein the wireless network is an IEEE 802.11 wireless network.

78. The ALCD of claim 70 or 71, wherein the augmented-autonomous mode utilizes an external device that is capable of transmitting augmented-aiding information.

79. The ALCD of claim 78, wherein the external device utilizes a wireless transmission to transmit the augmented-aiding information.

80. The ALCD of claim 79, wherein the wireless transmission includes a Bluetooth transmission.

81. The ALCD of claim 79, wherein the wireless transmission includes an IEEE 802.11 transmission.

82. The ALCD of claim 79, wherein the external device includes a GPS wireless re-radiator.

83. The ALCD of claim 78, wherein the external device utilizes a non-wireless transmission to transmit the augmented-aiding information.

84. The ALCD of claim 78, wherein the augmented-aiding information includes the location information for the external device.

85. The ALCD of claim 84, wherein the augmented-aiding information includes ephemeris data for the GPS satellites.

86. The ALCD of claim 69 or 70, wherein the position-determination section switches between the GPS-standalone mode and the at least one other mode when a predetermined event occurs.

87. The ALCD of claim 86, wherein the predetermined event is initial acquisition of at least one GPS satellite signal.

88. The ALCD of claim 87, wherein the selective switching of the GPS receiver switches the position-determination section from the at least one other position-determination mode to the GPS-standalone mode.

89. The ALCD of claim 88, wherein the ALCD is capable of receiving information from a second source.

90. The ALCD of claim 89, wherein the second source is selected from a group consisting of:
    a Bluetooth network;
    a specialized mobile radio ("SMR") network;
    a personal communication system ("PCS") network;
    a non-wireless local area network;
    a wireless local area network;
    an infrared network;
    a paging network;
    a two-way paging network; and
    an FM broadcast network.

91. The ALCD of claim 90, wherein the wireless local area network is an IEEE 802.11 wireless network.

92. The ALCD of claim 90, wherein the geolocation of the ALCD is determined utilizing GPS-signals from at least one GPS satellite and the information from the second source.

93. An Aided Location Communication Device ("ALCD"), the ALCD comprising:
    a host processor for communicating with a wireless communications network; and
    a position-determination section having a GPS-engine, which acquires and tracks a GPS signal from a GPS satellite, communicates with the host processor,
    wherein the communicating means is capable of selectively switching from:
        a first mode position-determination mode for determining a geolocation of the ALCD, to
            at least one other position-determination mode for determining the geolocation of the ALCD, in response to the host processor determining that the geolocation has been determined in the first position determination mode.

94. The ALCD of claim 93, wherein the GPS-engine is a GPS tracker capable of receiving GPS signals and producing GPS pseudo-range signals corresponding to the received GPS signals.

95. The ALCD of claim 94 wherein the first mode position-determination mode is selected from a group consisting of:
    GPS-standalone mode;
    a GPS-autonomous mode;
    a GPS-network aided mode;
    a GPS-network centric mode;
    a network-based mode;
    a reverse-aiding mode; and
    an augmented-autonomous mode.

96. The ALCD of claim 95 wherein the at least one other position determination mode is selected from a group consisting of:
    the GPS-standalone mode;
    the GPS-autonomous mode;
    the GPS-network aided mode;
    the GPS-network centric mode;
    network-based mode;
    the reverse-aiding mode; and
    the augmented-autonomous mode.

97. An Aided Location Communication System ("ALCS"), comprising:
    an Aided Location Communication Device ("ALCD"), including
        a communication section having a host processor;
        a GPS section for acquiring and tracking a GPS signal from a GPS satellite, and communicating with the host processor, and
        a strategy selector, external to and coupled to the GPS section, that determines a positioning strategy based upon a state of the GPS section, wherein the strategy selector is capable of selectively switching from:
            a first position-determination mode for determining a geolocation of the ALCD, to
                at least one other position-determination mode for determining the geolocation of the ALCD, in response to the host processor determining that the geolocation has been determined in the first position determination mode
    wherein the host processor is coupled to the GPS section and the strategy selector, for transmitting and receiving data to and from a geolocation server; and
    a geolocation server, which communicates with the communications section of the ALCD via a communications network, including
        an aiding data generation section for forming location aiding data; and
        a communication control section for transmitting data to and receiving data from the ALCD.

98. An Aided Location Communication Device ("ALCD") tracking at least one GPS satellite, comprising:
    a bus structure,
    a Central Processing Unit (CPU) core comprising
        a host microprocessor, coupled to the bus structure;
        a cache memory coupled to the bus structure for storing software code;
        a random access memory, coupled to the bus structure, for storing data;
        a read only memory, coupled to the bus structure, for storing a boot program; and
    a GPS engine, which acquires and tracks a GPS signal from the GPS satellite, and communicates with the host microprocessor, the GPS engine comprising
        a receiving, tracking, and demodulating engine for GPS and Wide Area Augmentation Service (WAAS) signals, wherein the GPS architecture can couple to at least two different protocol interfaces via the bus structure,
    wherein the host microprocessor is capable of selectively switching from:

a first position-determination mode for determining a geolocation of the ALCD, to at least one other position-determination mode for determining the geolocation of the ALCD in response to the host processor determining that the geolocation has been determined in the first position determination mode.

99. An Aided Location Communication Device ("ALCD") for tracking at least one GPS satellite, comprising:
a bus structure,
a Central Processing Unit (CPU) core comprising:
 a host microprocessor, coupled to the bus structure;
 a cache memory coupled to the bus structure for storing software code;
 a random access memory, coupled to the bus structure, for storing data and for storing autonomous code used for tracking at least one GPS satellite;
 a read only memory, coupled to the bus structure, for storing a boot program; and
a GPS engine, which acquires and tracks a GPS signal from the GPS satellite, and communicates with the host microprocessor, the GPS engine comprising:
 a receiving, tracking, and demodulating engine for GPS and Wide Area Augmentation Service (WAAS) signals, wherein the GPS engine can selectively use the stored autonomous code for tracking at least one GPS satellite,
wherein the host microprocessor is capable of selectively switching from:
 a first position-determination mode for determining a geolocation of the ALCD to
 at least one other position-determination mode for determining the geolocation of the ALCD, in response to the host processor determining that the geolocation has been determined in the first position determination mode.

100. An Aided Location Communication Device ("ALCD") for tracking at least one GPS satellite, comprising:
a bus structure,
a Central Processing Unit (CPU) core comprising
 a host microprocessor, coupled to the bus structure;
 a cache memory coupled to the bus structure for storing software code;
 a random access memory, coupled to the bus structure, for storing data;
 a read only memory, coupled to the bus structure, for storing a boot program; and
a GPS engine, which acquires and tracks a GPS signal from the GPS satellite, and communicates with the host microprocessor, the GPS engine comprising:
 a receiving, tracking, and demodulating engine for GPS and Wide Area Augmentation Service (WAAS) signals, wherein the GPS architecture can couple, via the bus structure, to at least two different protocol interfaces, and wherein the protocol interface is selected by the GPS architecture automatically,
wherein the host microprocessor is capable of selectively switching from:
 a first position-determination mode for determining a geolocation of the ALCD, to
 at least one other position-determination mode for determining the geolocation of the ALCD, in response to the host processor determining that the geolocation has been determined in the first position determination mode.

101. A method for determining the geolocation of an Aided Location Communication Device ("ALCD"), having a position-determination section and a communication section, within an Aided Location Communication System ("ALCS"), the method comprising:
 acquiring and tracking, by a GPS engine, at least one GPS-signal, from at least one GPS satellite, and communicating with a host processor,
 switching, by the host processor, from:
  a first position-determination mode for determining a geolocation of the ALCD, to
  at least one other position-determination mode for determining the geolocation of the ALCD, in response to the host processor determining that the geolocation has been determined in the first position determination mode.

102. The method of claim 101 wherein the first position-determination mode is selected from a group consisting of:
 a GPS-standalone mode;
 a GPS-autonomous mode;
 a GPS-network aided mode;
 a GPS-network centric mode;
 a network-based mode;
 a reverse-aiding mode; and
 an augmented-autonomous mode.

103. The method of claim 102 wherein the at least one other position determination mode is selected from a group consisting of:
 the GPS-standalone mode;
 the GPS-autonomous mode;
 the GPS-network aided mode;
 the GPS-network centric mode;
 the network-based mode;
 the reverse-aiding mode; and
 the augmented-autonomous mode.

104. The method of claim 103, wherein the geolocation of ALCD is determined utilizing the selected at least one other position-determination mode immediately after switching into the selected at least one other position-determination mode.

105. The method of claim 103, further including selectively sending the determined geolocation of the ALCD to a geolocation server in the ALCS.

106. The method of claim 105, wherein the determining the geolocation is performed by the ALCD.

107. The method of claim 106, wherein the position-determination utilizes a GPS-engine and the communication section determines the geolocation of the ALCD.

108. The method of claim 106, wherein the selective sending of the determined geolocation of the ALCD is performed by the ALCD, and the geolocation is sent from the ALCD to the geolocation server.

109. The method of claim 106, wherein selectively switching includes automatically selectively switching the ALCD.

110. The method of claim 103, wherein the augmented-autonomous mode is selected further including receiving augmented-mode information from a network resource selected from a group consisting of:
 a computer network;
 a communication network; and
 a wireless network.

111. The method of claim 110, wherein the wireless network is a Bluetooth wireless network.

112. The method of claim 110, wherein the wireless network is an IEEE 802.11 wireless network.

113. The method of claim 103, wherein selecting the augmented autonomous mode further including receiving augmented-aiding information transmitted from an external device.

114. The method of claim 113, wherein the augmented-aiding information is received via a wireless transmission.

115. The method of claim 114, wherein the augmented-aiding information is received via a Bluetooth transmission.

116. The method of claim 114, wherein the augmented-aiding information is received via an IEEE 802.11 transmission.

117. The method of claim 113, wherein receiving augmented-aiding information transmitted from an external device includes receiving the augmented-aiding information transmitted from a stationary object.

118. The method of claim 117, wherein receiving the augmented-aiding information transmitted from a stationary object includes receiving the augmented-aiding information transmitted from an EXIT sign.

119. The method of claim 117, wherein receiving the augmented-aiding information transmitted from a stationary object includes receiving the augmented-aiding information transmitted from a traffic sign.

120. The method of claim 117, wherein receiving the augmented-aiding information transmitted from a stationary object includes receiving the augmented-aiding information transmitted from a light post.

121. The method of claim 113, wherein the augmented-autonomous mode includes receiving the augmented-aiding information transmitted from an external device that includes GPS re-radiated aiding information.

122. The method of claim 113, wherein the augmented-aiding information is received via a non-wireless transmission.

123. The method of claim 122, wherein the augmented-aiding information is a received via a serial connection.

124. The method of claim 122, wherein the augmented-autonomous mode includes receiving the augmented-aiding information via an Ethernet connection.

125. The method of claim 122, wherein the augmented-autonomous mode includes receiving the augmented-aiding information via an electrical connection.

126. The method of claim 125, wherein the augmented-autonomous mode includes receiving the augmented-aiding information from a battery charger within the external device.

127. The method of claim 103 wherein
the augmented-autonomous mode is selected further including receiving augmented-mode information from a network resource selected from a group consisting of:
a computer network;
a communication network; and
a wireless network, and
wherein receiving the augmented-aiding information includes receiving ephemeris data for the GPS satellites.

128. The method of claim 127 wherein selecting the augmented autonomous mode further including receiving the augmented-aiding information transmitted from an external device.

129. The method of claim 128 wherein receiving the augmented-aiding information transmitted from an external device includes receiving the location information for the external device.

130. The method of claim 103 wherein the ALCD selectively switches between the GPS-standalone mode and the at least one other mode when a predetermined event occurs.

131. The method of claim 130 wherein the predetermined event is initial acquisition of at least one GPS satellite signal.

132. The method of claim 130 further including selectively switching from the at least one other position-determination mode to the GPS-standalone mode.

133. The method of claim 132 wherein the ALCD receives information from a second source.

134. The method of claim 133 wherein the second source is selected from a group consisting of
Bluetooth network;
a specialized mobile radio ("SMR") network;
a personal communication system ("PCS") network;
a non-wireless local area network;
a wireless local area network;
an infrared network;
a paging network;
a two-way paging network; and
an FM broadcast network.

135. The method of claim 134 wherein the wireless local area network is an IEEE 802.11 wireless network.

136. The method of claim 135 wherein the geolocation of the ALCD is determined utilizing GPS-signals from at least one GPS satellite and the information from the second source.

137. The method of claim 130 further including selectively displaying the determined geolocation of the ALCD on the ALCD.

* * * * *